US010583565B2

(12) United States Patent
Miyamoto

(10) Patent No.: US 10,583,565 B2
(45) Date of Patent: Mar. 10, 2020

(54) CONTROL APPARATUS, ROBOT AND ROBOT SYSTEM

(71) Applicant: Seiko Epson Corporation, Tokyo (JP)

(72) Inventor: Yoshito Miyamoto, Matsumoto (JP)

(73) Assignee: Seiko Epson Corporation (JP)

( * ) Notice: Subject to any disclaimer, the term of this patent is extended or adjusted under 35 U.S.C. 154(b) by 242 days.

(21) Appl. No.: 15/687,806

(22) Filed: Aug. 28, 2017

(65) Prior Publication Data

US 2018/0056521 A1 Mar. 1, 2018

(30) Foreign Application Priority Data

Aug. 30, 2016 (JP) .................. 2016-167623
May 31, 2017 (JP) .................. 2017-107555

(51) Int. Cl.
| | |
|---|---|
| *B25J 13/08* | (2006.01) |
| *B05C 11/10* | (2006.01) |
| *B25J 11/00* | (2006.01) |
| *B05C 5/02* | (2006.01) |

(52) U.S. Cl.
CPC ............ *B25J 13/085* (2013.01); *B05C 5/02* (2013.01); *B05C 11/1018* (2013.01); *B25J 11/00* (2013.01); *B25J 11/0075* (2013.01); *B25J 13/088* (2013.01); *B05C 5/022* (2013.01)

(58) Field of Classification Search
CPC ........ B25J 13/085; B25J 11/00; B25J 13/088; B25J 11/0075; B05C 11/1018; B05C 5/02; B05C 5/022
USPC ................................................ 700/245, 253
See application file for complete search history.

(56) References Cited

U.S. PATENT DOCUMENTS

| | | | | |
|---|---|---|---|---|
| 6,337,355 B1* | 1/2002 | Yamashita | ............ | B29C 31/041 428/314.4 |
| 2006/0259195 A1* | 11/2006 | Eliuk | .................. | A61J 1/20 700/245 |
| 2007/0191758 A1* | 8/2007 | Hunter | ................... | A61B 17/20 604/22 |
| 2007/0220963 A1* | 9/2007 | Morita | ................ | B60C 23/0408 73/146 |
| 2010/0022918 A1* | 1/2010 | Fujie | ..................... | A61B 17/32 600/587 |
| 2012/0190981 A1* | 7/2012 | Harris | .................... | A61B 34/30 600/439 |
| 2013/0005056 A1* | 1/2013 | Kim | ........................ | H01L 22/12 438/16 |
| 2014/0155912 A1* | 6/2014 | Bodduluri | ......... | A61B 17/32053 606/130 |
| 2014/0318274 A1* | 10/2014 | Zimmerman | .......... | B01D 15/14 73/863 |
| 2016/0229121 A1* | 8/2016 | Ilic | .......................... | B29C 64/20 |

(Continued)

FOREIGN PATENT DOCUMENTS

JP        2005-334785 A        12/2005

*Primary Examiner* — Jaime Figueroa
(74) *Attorney, Agent, or Firm* — Harness, Dickey & Pierce, P.L.C.

(57) ABSTRACT

A control apparatus that controls a robot having a force detection part and a movable unit including an injection part that can inject an injected material to an object, includes a processor that is configured to generate teaching data in a position of the movable unit when the movable unit is moved from the object by a first distance after sensing of contact between the movable unit and the object based on output from the force detection part.

20 Claims, 14 Drawing Sheets

(56) References Cited

U.S. PATENT DOCUMENTS

2016/0368150 A1* 12/2016 Maruyama ............. B25J 9/1697
2017/0028557 A1*  2/2017 Battisti ................. B25J 9/0081
2017/0182665 A1*  6/2017 Okuyama ............. B25J 9/1697

* cited by examiner

CONTROL APPARATUS, ROBOT AND ROBOT SYSTEM

BACKGROUND

1. Technical Field

The present invention relates to a control apparatus, a robot, and a robot system.

2. Related Art

In related art, industrial robots including robot arms and end effectors attached to the distal ends of the robot arms are known. The robots perform various kinds of work including grasping, carrying, assembly of objects.

As an example of the robots, for example, Patent Document 1 (JP-A-2005-334785) discloses a robot including a head having a nozzle that ejects a liquid agent to an object. Further, the robot is controlled to perform ejection in a taught position by a control apparatus.

However, in the control apparatus in Patent Document 1, it is hard to teach the robot to accurately eject the liquid agent to a target part. Further, in teaching of the robot, generally, a method of moving the nozzle of the robot little by little directly with a hand of a worker and storing the positions of the movement in the control apparatus is used. According to the method, there is a problem that teaching varies widely depending on workers.

SUMMARY

An advantage of some aspects of the invention is to solve at least a part of the problems described above, and the can be implemented as the following configurations.

A control apparatus according to an aspect of the invention is a control apparatus that controls a robot having a movable unit including an injection part that can inject an injected material to an object and a force detection part, including a generation part that generates teaching data in a position of the movable unit when the movable unit is moved from the object by a first distance after sensing of contact between the movable unit and the object based on output from the force detection part.

According to the control apparatus of the aspect of the invention, the teaching data in the position of the movable unit when the movable unit is moved by the first distance after sensing of the contact, and thereby, the robot controlled by the control apparatus according to the aspect of the invention may appropriately perform work in a target part. For example, the apparatus is particularly effective in work performed at the first distance kept without contact between the movable unit and the object. Further, the contact with the object may be sensed based on the output from the force control part, and thereby, variations depending on workers in the determination of contact may be reduced. Furthermore, visual confirmation by the worker may be omitted and reliability of the work performed by the robot based on the teaching data may be improved. Here, "teaching data" is data for teaching an operation to be performed by the robot to the robot.

In the control apparatus according to the aspect of the invention, it is preferable that the generation part performs first processing of generating data on a position of the injection part when the injection part is moved from the object by the first distance after sensing of the contact between the injection part and the object.

The robot is controlled using the teaching data generated based on the data, and thereby, the robot controlled by the control apparatus according to the aspect of the invention may inject the injected material to an appropriate part in proper shape, size, and amount.

In the control apparatus according to the aspect of the invention, it is preferable that the generation part performs second processing of generating data on an attitude of the injection part when the attitude of the injection part with respect to the object is changed based on output from an angle detection part that detects an angle of the injection part with respect to the object.

The robot is controlled using the teaching data generated based on the data, and thereby, the robot controlled by the control apparatus according to the aspect of the invention may inject the injected material in more proper shape, size, and amount.

In the control apparatus according to the aspect of the invention, it is preferable that the angle detection part controls the robot provided in the movable unit.

With this configuration, the angle of the injection part with respect to the object may be accurately measured. Accordingly, the accuracy of the work on the object by the robot controlled by the control apparatus according to the aspect of the invention may be further improved.

In the control apparatus according to the aspect of the invention, it is preferable that the second processing is performed based on output from an inclinometer as the angle detection part.

The inclinometer is effective because the inclinometer has a relatively simple configuration and may easily measure the angle of the injection part with respect to the object.

In the control apparatus according to the aspect of the invention, it is preferable that the first processing or the second processing is performed after the movable unit is moved by direct teaching.

By the direct teaching, the operation of moving the movable unit closer to the target part of the object may be promptly and easily taught, and the next first processing or second processing may be smoothly performed.

In the control apparatus according to the aspect of the invention, it is preferable that the second processing is performed after the first processing.

With this configuration, the accuracy of the teaching data may be improved.

In the control apparatus according to the aspect of the invention, it is preferable that the first processing is performed after the second processing.

With this configuration, for example, the accuracy of the teaching data in the case where the object is tilted with respect to the horizontal plane may be especially improved.

In the control apparatus according to the aspect of the invention, it is preferable that the first processing and the second processing are performed at the same time or to temporally overlap.

With this configuration, the data on the position of the injection part may be generated while the attitude of the injection part is detected, and thereby, the accuracy of the teaching data may be further improved.

In the control apparatus according to the aspect of the invention, it is preferable that the first distance can be set in advance.

With this configuration, for example, the first distance depending on details of work to be performed by the robot, work environments, types of injected material, etc. may be used.

In the control apparatus according to the aspect of the invention, it is preferable that the generation part generates a continuous movement route of the movable unit along a shape of the object between a first part of the object and a second part of the object based on first data on a position of the movable unit when the movable unit is moved by the first distance after contact between the movable unit and the first part of the object is sensed and second data on a position of the movable unit when the movable unit is moved by the first distance after contact between the movable unit and the second part different from the first part is sensed.

With this configuration, the movement route of the movable unit between the first part and the second part may be generated without contact of the movable unit with a part between the first part and the second part of the object.

In the control apparatus according to the aspect of the invention, it is preferable that a selection part that can select the first distance and a second distance is provided, wherein the generation part generates teaching data in a position of the movable unit when the movable unit is moved from the object by the second distance different from the first distance after sensing of contact between the movable unit and the object on which the robot works based on the output from the force detection part.

With this configuration, an appropriate distance of the movable unit with respect to the object can be set depending on the intended use.

A robot according to an aspect of the invention is controlled by the control apparatus according to the aspect of the invention.

According to the robot of the aspect of the invention, work in the target part may be appropriately performed.

A robot system according to an aspect of the invention includes the control apparatus according to the aspect of the invention, and a robot controlled by the control apparatus and having the movable unit including the force detection part.

According to the robot system of the aspect of the invention, the robot may appropriately perform work in the target part.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a control apparatus, a robot, and a robot system of the invention will be explained in detail based on embodiments shown in the accompanying drawings.

First Embodiment

Robot System

First, the first embodiment of the robot system according to the invention will be explained.

Figure 1:
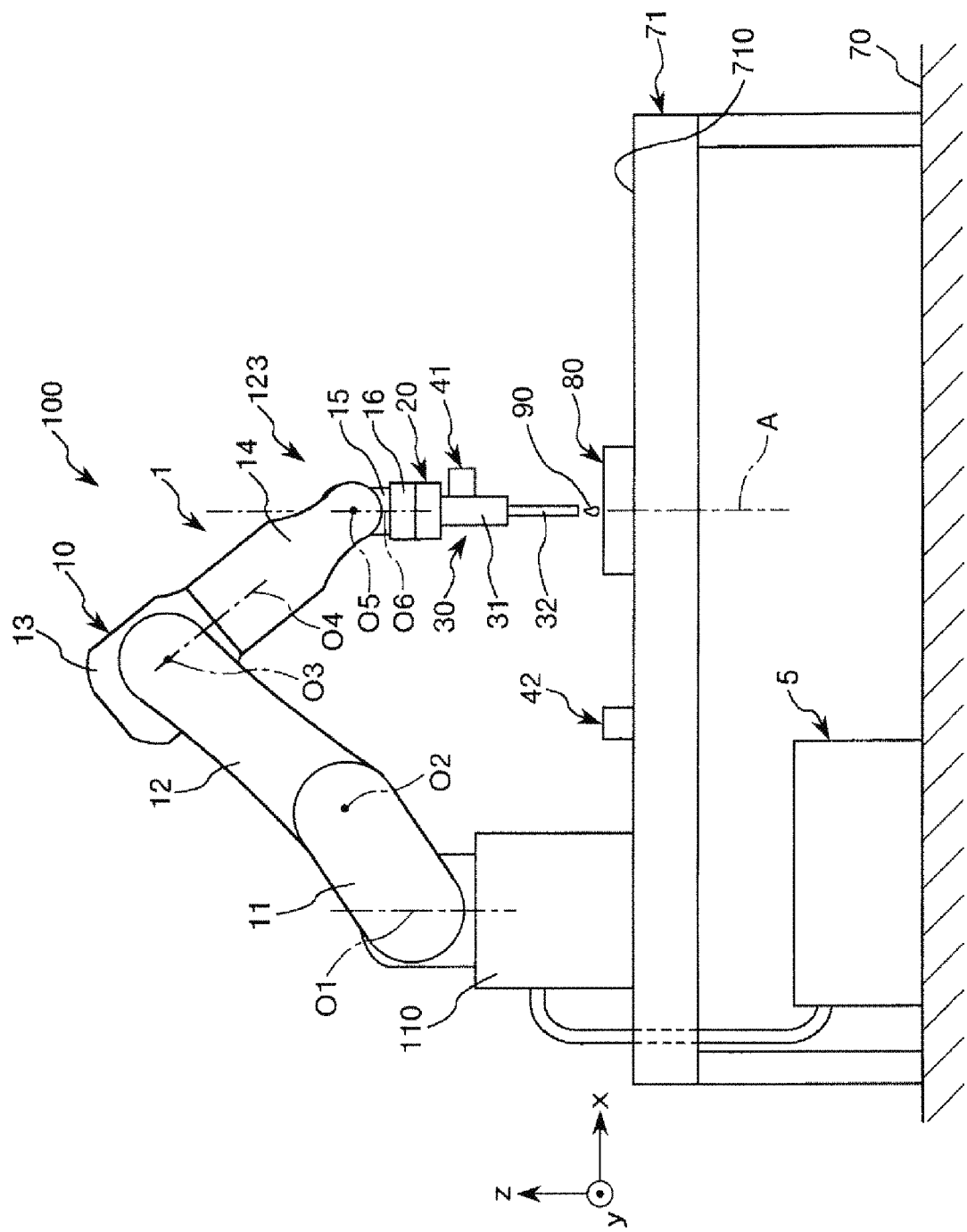
FIG. 1 is a schematic side view of a robot system according to the first embodiment of the invention.
Figure 2:
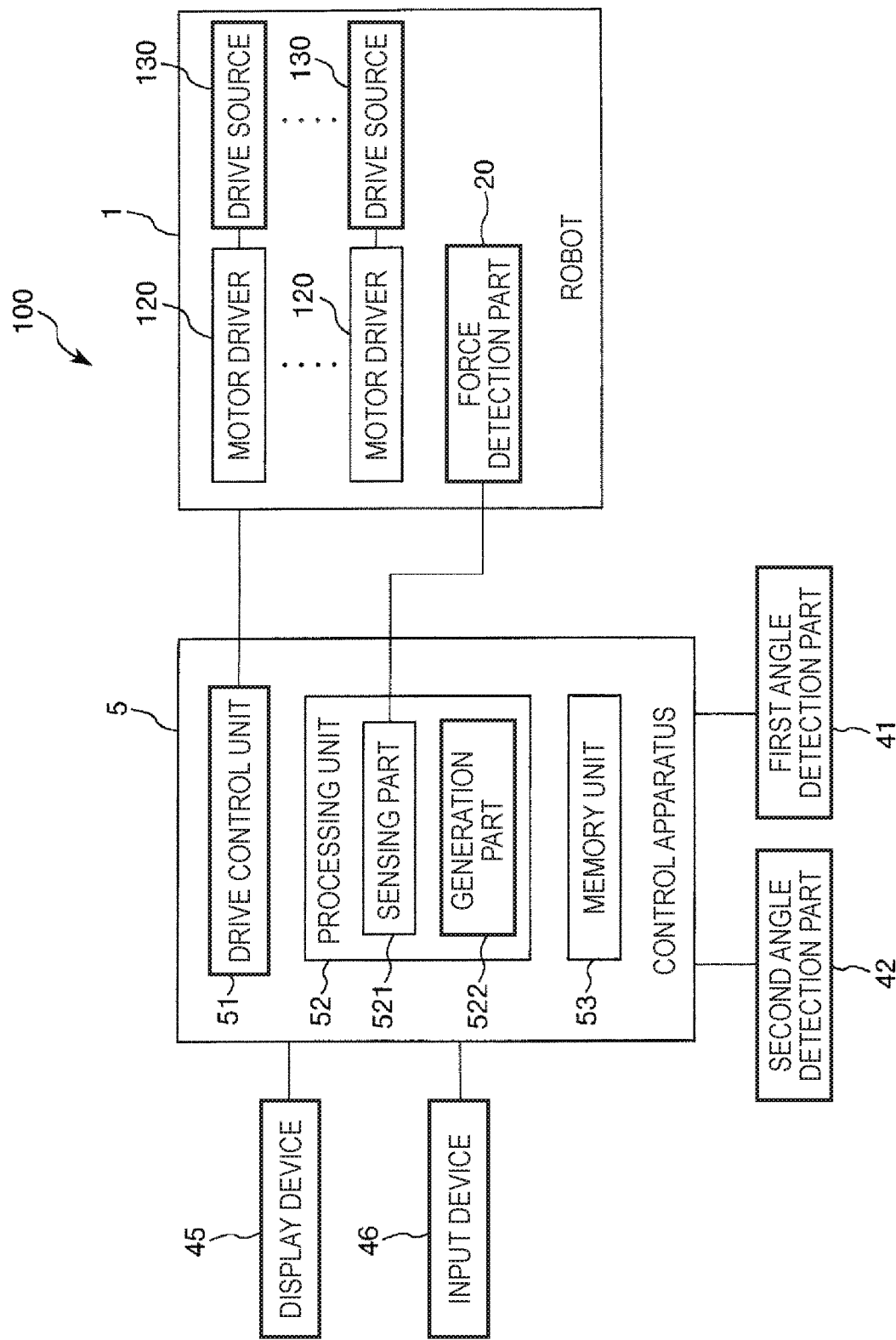
FIG. 2 is a system configuration diagram of the robot system shown in FIG. 1.

FIG. 1 is a schematic side view showing the robot system according to the first embodiment of the invention. FIG. 2 is a system configuration diagram of the robot system shown in FIG. 1. Hereinafter, the base side in FIG. 1 is referred to as "proximal end" and the opposite side is referred to as "distal end". Further, in FIG. 1, for convenience of explanation, as three axes orthogonal to one another, an x-axis, a y-axis, and a z-axis are shown. In the embodiment, the x-axis, y-axis, and z-axis show abase coordinate system. Hereinafter, directions parallel to the x-axis are also referred to as "x-axis directions", directions parallel to the y-axis are also referred to as "y-axis directions", and directions parallel to the z-axis are also referred to as "z-axis directions". Further, hereinafter, the distal end side of each arrow is referred to as "+ (plus)" and the proximal end side of each arrow is referred to as "− (minus)", the direction parallel to the +x-axis direction is also referred to as "+x-axis direction", the direction parallel to the −x-axis direction is also referred to as "−x-axis direction", the direction parallel to the +y-axis direction is also referred to as "+y-axis direction", the direction parallel to the −y-axis direction is also referred to as "−y-axis direction", the direction parallel to the +z-axis direction is also referred to as "+z-axis direction", and the direction parallel to the −z-axis direction is also referred to as "−z-axis direction".

Furthermore, in FIG. 1, the +z-axis side is referred to as "upper" and the −z-axis side is referred to as "lower". In FIG. 1, the z-axis directions are referred to as "vertical directions" and the directions orthogonal to the z-axis directions (the directions parallel to the x-y plane) are referred to as "horizontal directions". In the specification, "horizontal" includes tilts within a range of 5° or less with respect to the horizontal. Similarly, in the specification, "vertical" includes tilts within a range of 5° or less with respect to the vertical.

A robot system 100 shown in FIG. 1 includes a robot 1, a control apparatus 5 that controls operation of the robot 1, a first angle detection part 41, and a second angle detection part 42. The robot system 100 is used in a manufacturing process for manufacturing "objects" including precision apparatuses such as wrist watches and cell phones and components thereof or the like. Note that, in the embodiment, the case where an object 80 as a plate-like member in a rectangular shape in the plan view is used as "object" will be explained as an example.

Robot

The robot 1 in the embodiment performs work of ejecting (injecting) an ejected material 90 (injected material) to the object 80.

The robot 1 shown in FIG. 1 is a six-axis vertical articulated robot. The robot 1 has a base 110 and a movable unit 123. The movable unit 123 has a robot arm 10 connected to the base 110, a force detection part 20 provided in the distal end part of the robot arm 10, and a dispenser 30 (ejection part, injection part) as an end effector provided on the distal end side of the force detection part 20. Further, as shown in FIG. 2, the robot 1 includes a plurality of drive sources 130 and a plurality of motor drivers 120.

As shown in FIG. 1, in the embodiment, the robot 1 is provided on a work surface 710 as an upper surface of a worktable 71 installed in an installation location 70 such as a floor, for example.

The robot arm 10 includes a first arm 11 (arm), a second arm 12 (arm), a third arm 13 (arm), a fourth arm 14 (arm), a fifth arm 15 (arm), and a sixth arm 16 (arm). The first arm 11, the second arm 12, the third arm 13, the fourth arm 14, the fifth arm 15, and the sixth arm 16 are sequentially coupled from the proximal end side toward the distal end side. The first arm 11 is connected to the base 110 mounted on the work surface 710.

The base 110 and the first arm 11 are coupled via a joint and the first arm 11 is rotatable about a first rotation axis O along the vertical directions with respect to the base 110. The first arm 11 and the second arm 12 are coupled via a joint and the second arm 12 is rotatable about a second rotation axis O2 along the horizontal directions with respect to the first arm 11. The second arm 12 and the third arm 13 are coupled via a joint and the third arm 13 is rotatable about a third rotation axis O3 along the horizontal directions with respect to the second arm 12. The third arm 13 and the fourth arm 14 are coupled via a joint and the fourth arm 14 is rotatable about a fourth rotation axis O4 orthogonal to the third rotation axis O3 with respect to the third arm 13. The fourth arm 14 and the fifth arm 15 are coupled via a joint and the fifth arm 15 is rotatable about a fifth rotation axis O5 orthogonal to the fourth rotation axis O4 with respect to the fourth arm 14. The fifth arm 15 and the sixth arm 16 are coupled via a joint and the sixth arm 16 is rotatable about a sixth rotation axis O6 orthogonal to the fifth rotation axis O5 with respect to the fifth arm 15.

In the respective arms 11 to 16, the plurality of drive sources 130 having motors such as serve motors and reducers are respectively provided (see FIG. 2). That is, the robot 1 has the drive sources 130 in the same number (six in the embodiment) as that of the arms 11 to 16. The respective arms 11 to 16 are controlled by the control apparatus 5 via the plurality of (six in the embodiment) motor drivers 120 electrically connected to the corresponding drive sources 130.

Further, in the respective drive sources 130, e.g. angle sensors such as encoders (not shown) are provided. Thereby, the rotation angles of the rotation shafts of the motors or reducers of the respective drive sources 130 may be detected.

As shown in FIG. 1, the force detection part 20 is detachably attached to the distal end part of the sixth arm 16. The force detection part 20 is a force detector that detects forces and moment applied to the distal end part of the dispenser 30. In the embodiment, as the force detection part 20, a six-axis force sensor that may detect six components of translational force components Fx, Fy, Fz in the three axes (x-axis, y-axis, z-axis) directions orthogonal to one another and rotational force components (moment) Mx, My, Mz about the three axes (x-axis, y-axis, z-axis) is used.

As shown in FIG. 1, the dispenser 30 as "ejection part" (injection part) that ejects the ejected material 90 is detachably attached to the distal end part of the force detection part 20. The dispenser 30 has a main body part 31 having a filled portion filled with the ejected material 90, and a nozzle 32 connected to the distal end side of the main body part 31 and ejecting the ejected material 90. Here, "dispenser" in the specification is an ejected material ejecting device and the ejected material 90 ejected by the dispenser 30 is not limited to a liquid-state material, but includes e.g. a gel-state material and solid-state material. Note that, in the specification, the material that has been ejected (injected) and the material to be ejected (injected) are collectively referred to as "ejected material 90 (injected material)".

The above explained robot 1 has the movable unit 123 and the force detection part 20 that detects the force applied to the movable unit 123 as described above. The robot 1 as an example of the robot according to the invention is controlled by the control apparatus 5 as an example of the control apparatus according to the invention, which will be described later. According to the robot 1, the robot is controlled by the control apparatus 5 to be described later, and thereby, may properly perform work of ejecting the ejected material 90 to a target location of the object 80 or the like.

First Angle Detection part

As shown in FIG. 1, the first angle detection part 41 is detachably provided in the dispenser 30.

The first angle detection part 41 detects the angle of the dispenser 30 with respect to the work surface 710 parallel to the horizontal directions. More specifically, the first angle detection part 41 may detect the angle of a center line A of the nozzle 32 with respect to an axis line parallel to the work surface 710 as a supporting axis.

Further, in the embodiment, the upper surface of the object 80 is nearly parallel to the work surface 710. Accordingly, the first angle detection part 41 is used, and thereby, the angle of the center line A of the dispenser 30 with respect to the upper surface of the object 80 may be measured.

The first angle detection part 41 may have any configuration as long as the part may detect the angle of the dispenser 30 with respect to a predetermined supporting axis (e.g. the axis line parallel to the work surface 710) and includes e.g. an acceleration sensor and inclinometer. Of them, it is preferable that the first angle detection part 41 (angle detection part) is an inclinometer. That is, it is preferable that the control apparatus 5 performs teaching (specifically, second processing), which will be described later, based on the output from the inclinometer as the first angle detection part 41 (angle detection part).

For example, the inclinometer may be an inclinometer that measures the angle with respect to the predetermined supporting axis by outputting a voltage according to an angle change. This type of inclinometer is effective because the inclinometer has a relatively simple configuration and may easily measure the angle of the center line A of the dispenser 30 with respect to the work surface 710. The resolution of the inclinometer is not particularly limited, but, if the resolution is about 0.01° to 0.05°, for example, work of ejecting the ejected material 90 as an adhesive may be performed especially preferably. Note that the first angle detection part 41 may have a configuration including a laser displacement meter (laser displacement sensor).

Further, as described above, the first angle detection part 41 (angle detection part) is provided in the movable unit 123. Particularly, in the embodiment, the first angle detection part 41 is provided in the dispenser 30. That is, the control apparatus 5 controls the robot 1 with the first angle detection part 41 (angle detection part) provided in the movable unit 123 (in the embodiment, the dispenser 30). Thereby, the angle of the dispenser 30 with respect to the work surface 710 may be measured more accurately. Accordingly, the accuracy of the work on the object 80 by the robot 1 may be further improved.

Second Angle Detection Part

As shown in FIG. 1, the second angle detection part 42 having the same configuration as the first angle detection part 41 is detachably provided on the work surface 710. The second angle detection part 42 detects the angle of the work surface 710 with respect to the horizontal plane. In the embodiment, the worktable 71 is installed so that the work surface 710 may be parallel to the horizontal directions, however, whether or not the work surface 710 is parallel to the horizontal directions may be measured more accurately using the second angle detection part 42.

The second angle detection part 42 and the above described first angle detection part 41 are used, and thereby, the angle of the center line A of the dispenser 30 with respect to the work surface 710 may be measured more accurately based on a second detection result as a detection result output from the second angle detection part 42 and a first detection result as a detection result output from the first angle detection part 41.

Further, the second angle detection part 42 and the above described first angle detection part 41 are provided so that the center line A of the dispenser 30 may be perpendicular to the work surface 710 when the respective detection results agree with each other.

Note that the first angle detection part 41 and the second angle detection part 42 may be placed in any forms as long as the parts may measure the angle of the dispenser 30 with respect to the work surface 710. If the angle of the upper surface of the object 80 with respect to the horizontal plane is known, for example, the second angle detection part 42 may be omitted as appropriate. Or, the second angle detection part 42 is omitted and the first angle detection part 41 is detached from the dispenser 30 and placed on the work surface 710, and thereby, the first angle detection part 41 may be used as a substitution of the second angle detection part 42.

Control Apparatus

As shown in FIG. 1, in the embodiment, the control apparatus 5 is installed on the installation location 70 and located below the worktable 71. The control apparatus 5 may include a personal computer (PC) containing a processor like CPU (Central Processing Unit), ROM (Read Only Memory), and RAM (Random Access Memory) or the like.

As shown in FIG. 2, the control apparatus 5 has a drive control unit 51, a processing unit 52 having a sensing part 521 and a generation part 522, and a memory unit 53.

The drive control unit 51 controls driving of the respective drive sources 130 that drive the respective arms 11 to 16. For example, the drive control unit 51 may respectively independently drive and stop the respective arms 11 to 16 based on detection results (signals) output from the force detection part 20 and the angle sensors (not shown) provided in the respective drive sources 130. Further, in the embodiment, the drive control unit 51 can also control driving of the dispenser 30. For example, the drive control unit 51 may control amounts and ejection times of the ejected material 90 ejected from the dispenser 30.

The processing unit 52 performs calculations of various kinds of data etc. Further, the processing unit 52 has the sensing part 521 that senses whether or not the distal end of the dispenser 30 (the tip end of the nozzle 32) has been in contact with the object 80. Further, the processing unit 52 has the generation part 522 that generates teaching data based on the result sensed by the sensing part 521 etc. Here, the teaching data is data for teaching an operation to be performed by the robot 1 to the robot 1.

The memory unit 53 stores programs, data, etc. for the control apparatus 5 to perform various kinds of processing. Further, e.g. the detection results output from the force detection part 20 etc. may be stored in the memory unit 53.

The control apparatus 5 is connected to the robot 1 via a wire or the like (not shown). Note that the robot 1 and the control apparatus 5 may be connected via wireless communications. Further, in the embodiment, the control apparatus 5 is provided separately from the robot 1 as shown in FIG. 1, however, may be built in the robot 1.

As shown in FIG. 2, a display device 45 including a monitor having a screen and an input device 46 including a mouse and keyboard are respectively connected to the control apparatus 5 (including wireless communications). Note that a touch panel or the like may be connected to the control apparatus 5.

As above, the basic configuration of the robot system 100 is briefly explained. In the robot system 100, when the robot 1 performs the work of ejecting the ejected material 90 to the object 80, the operation in the ejection work is taught to the robot 1. As below, the teaching of the robot 1 by the control apparatus 5 will be explained.

Figure 3:
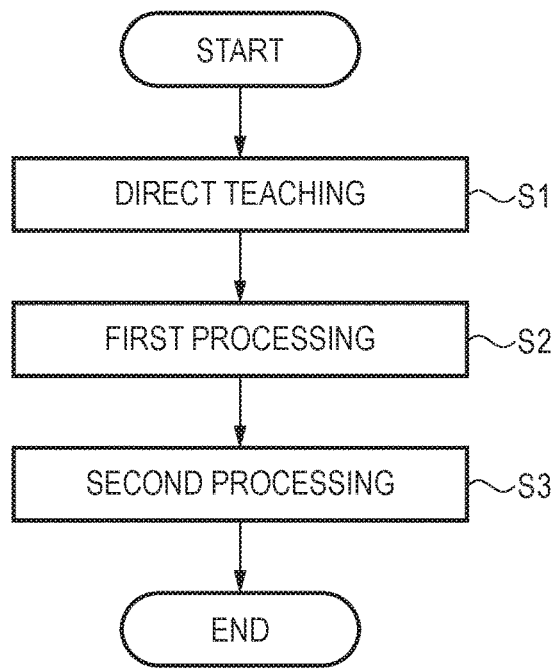
FIG. 3 is a flowchart for explanation of teaching of a robot by a control apparatus shown in FIG. 2.
Figure 4:
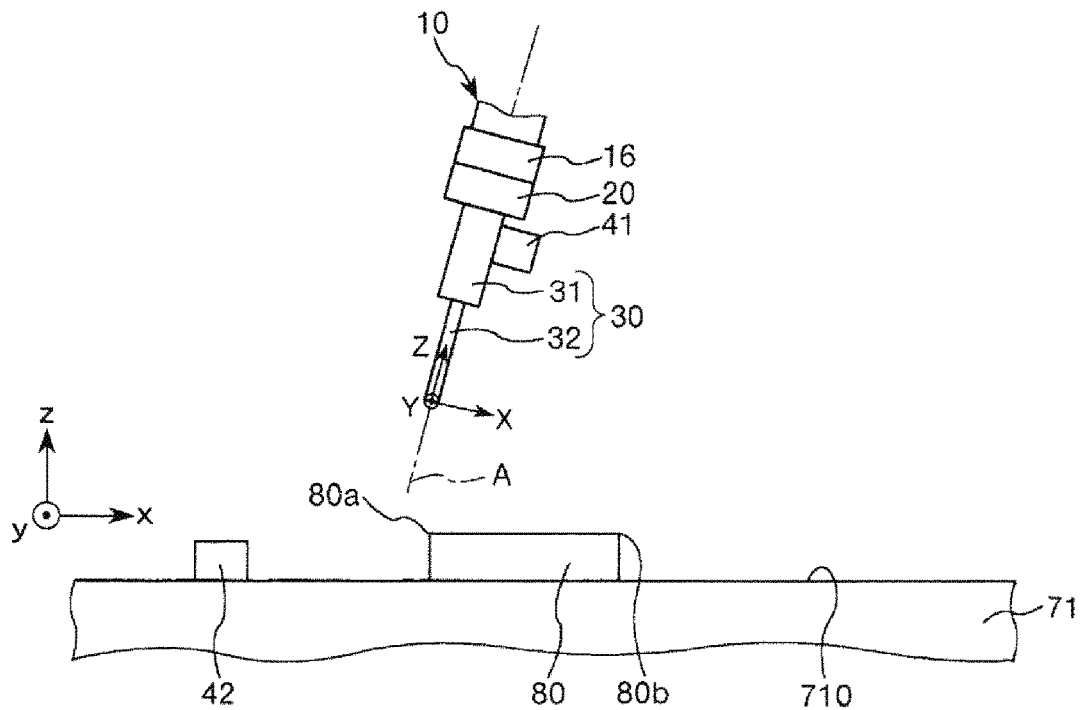
FIG. 4 shows a state in which a dispenser is moved closer to an object by direct teaching shown in FIG. 3.
Figure 5:
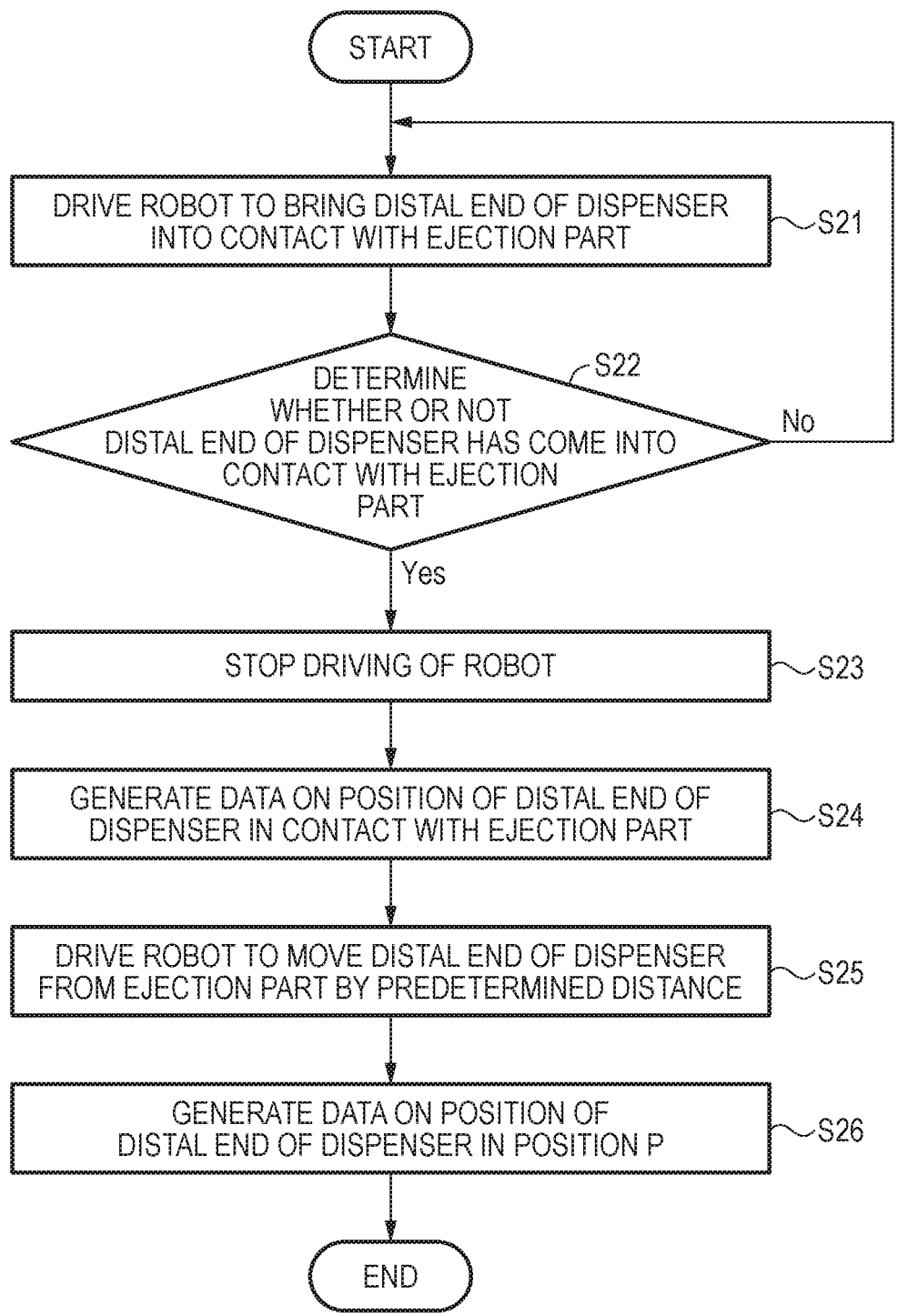
FIG. 5 is a flowchart for explanation of first processing shown in FIG. 3.
Figure 6:
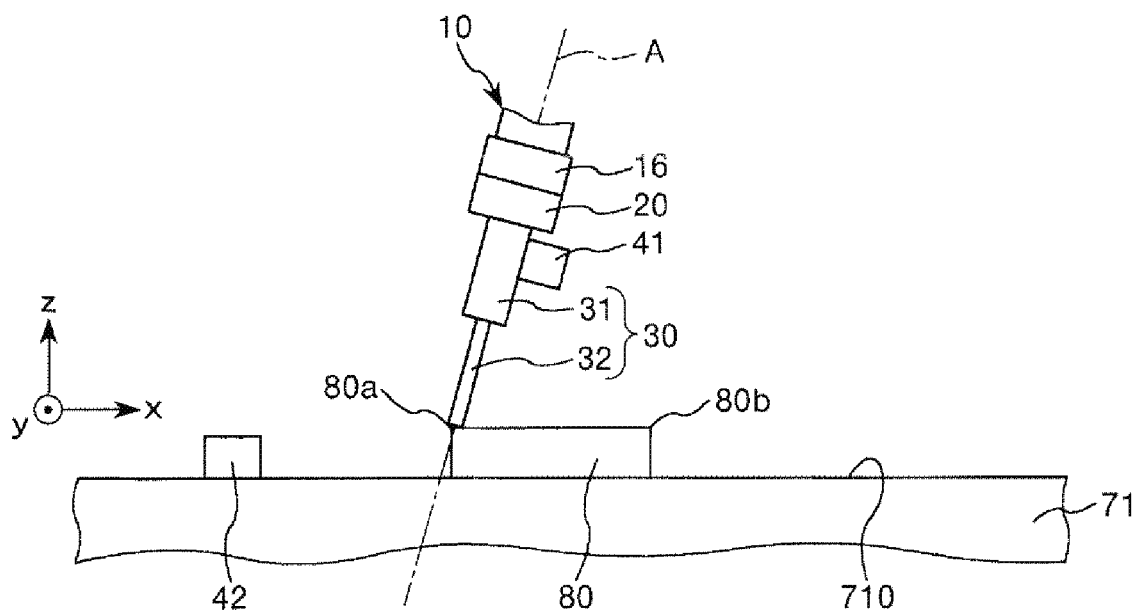
FIG. 6 shows a state in which the object and a distal end of the dispenser are in contact in the first processing shown in FIG. 5.
Figure 7:
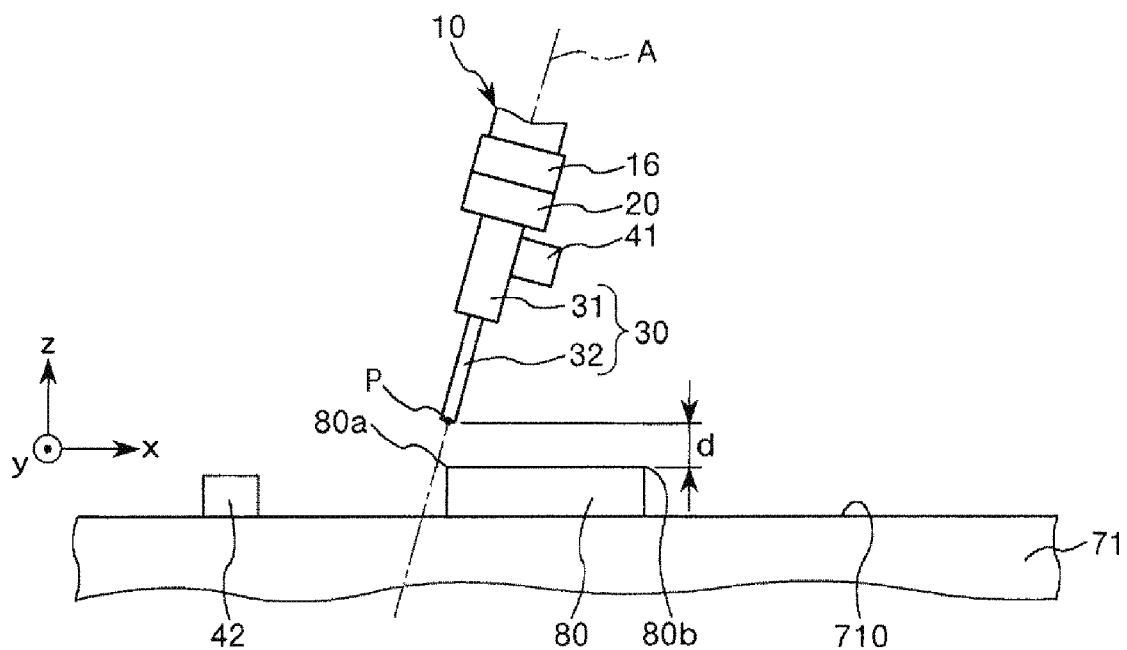
FIG. 7 shows a state in which the distal end of the dispenser is separated from the object by a first distance in the first processing shown in FIG. 5.
Figure 8:
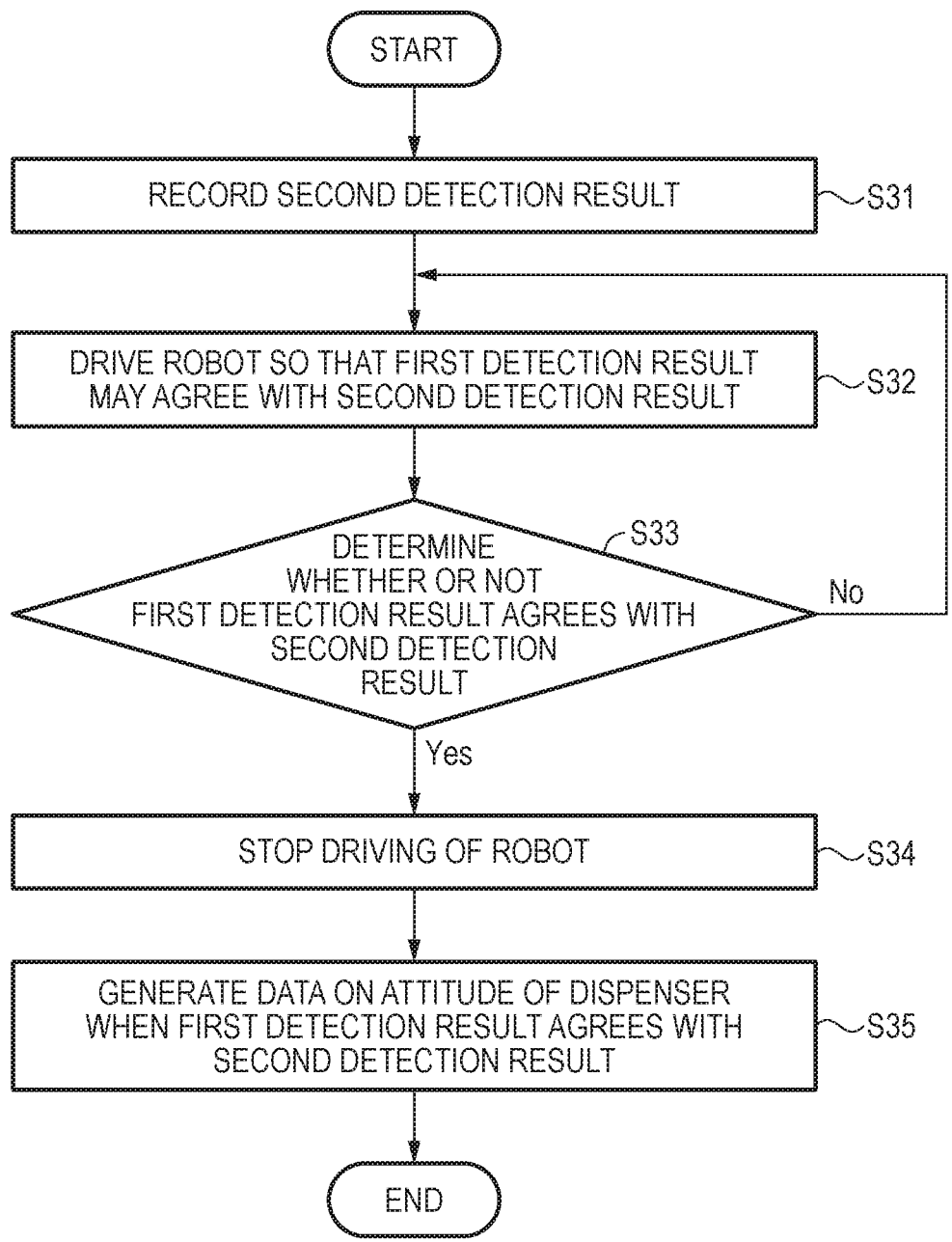
FIG. 8 is a flowchart for explanation of second processing shown in FIG. 3.
Figure 9:
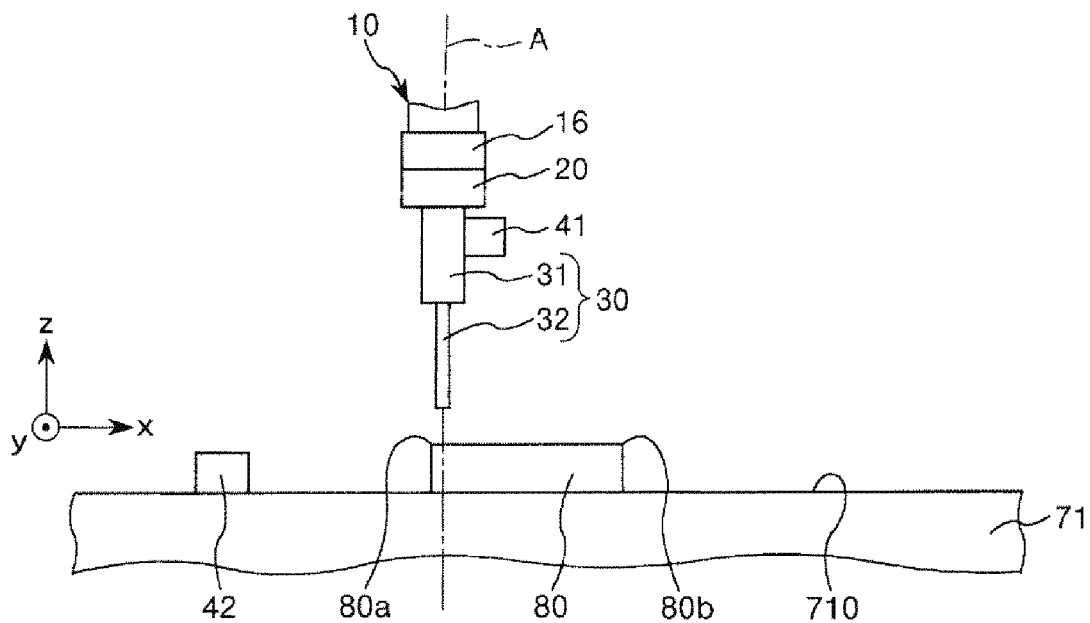
FIG. 9 shows a state of the dispenser when a first detection result and a second detection result agree in the second processing shown in FIG. 5.

FIG. 3 is a flowchart for explanation of the teaching of the robot by the control apparatus shown in FIG. 2. FIG. 4 shows a state in which the dispenser is moved closer to an object by direct teaching shown in FIG. 3. FIG. 5 is a flowchart for explanation of first processing shown in FIG. 3. FIG. 6 shows a state in which the object and the distal end of the dispenser are in contact in the first processing shown in FIG. 5. FIG. 7 shows a state in which the distal end of the dispenser is separated from the object by a first distance in the first processing shown in FIG. 5. FIG. 8 is a flowchart for explanation of second processing shown in FIG. 3. FIG. 9 shows a state of the dispenser when a first detection result and a second detection result agree in the second processing shown in FIG. 5.

As shown in FIG. 3, the teaching of the robot 1 is performed by executing [1] direct teaching (step S1), [2] first processing (step S2), and [3] second processing (step S3) in this order. As below, the respective processing will be sequentially explained. Further, as below, an example of the case of ejecting the ejected material 90 as a liquid adhesive to the upper surface of the object 80 will be explained.

[1] Direct Teaching (Step S1)

First, as shown in FIG. 4, a worker moves the distal end of the dispenser 30 closer to an ejection part 80a (a part in which ejection is to be performed) and teaches the operation of moving closer to the robot 1. In the embodiment, the worker teaches an operation of positioning the distal end of the dispenser 30 above (on the +z-axis side) the ejection part 80a of the object 80 to the robot 1. The operation is performed by the worker moving the robot arm 10 directly by hand and storing the operation in the control apparatus 5 by manually operating the control apparatus 5 using the input device 46 or the like, the so-called direct teaching.

It is preferable to move the movable unit 123 by direct teaching, and then, perform the first processing, which will be described later. According to the direct teaching, the operation of moving the distal end of the dispenser 30 close to the ejection part 80a (target part) may be promptly and easily taught, and the next first processing may be smoothly performed.

Here, the control apparatus 5 resets the force detection part 20. Further, the control apparatus 5 may set a local coordinate system as appropriate. For example, the control apparatus 5 may set three axes (X-axis, Y-axis, Z-axis) orthogonal to one another with the origin on the distal end of the dispenser 30 as the local coordinate system as shown in FIG. 4. Thereby, confirmation of teaching or the like may be easily performed and times for teaching, times for confirmation of teaching results, etc. may be shortened.

[2] First Processing (Step S2)

Next, the control apparatus 5 starts the first processing.

The first processing is processing of generating data on the position of the distal end of the dispenser 30 in the ejection part 80a. More specifically, the first processing is processing of generating data on the position of the distal end of the dispenser 30 when the dispenser 30 is moved from the object 80 by a first distance after sensing of the contact between the distal end of the dispenser 30 and the ejection part 80a is sensed based on the output from the force detection part 20. As below, the first processing will be explained with reference to the flowchart shown in FIG. 5.

As shown in FIG. 6, the drive control unit 51 of the control apparatus 5 drives the robot 1 so that the distal end of the dispenser 30 may come into contact with the ejection part 80a (step S21). In the embodiment, the drive control unit 51 drives the robot arm 10 to move the distal end of the dispenser 30 in the −z-axis direction as the direction closer to the ejection part 80a.

Then, the sensing part 521 determines whether or not the distal end of the dispenser 30 has come into contact with the ejection part 80a (step S22). The determination is performed based on the detection result output from the force detection part 20. Here, the memory unit 53 has stored (recorded) detection results (translational force components Fx, Fy, Fz and rotation force components Mx, My, Mz) of the force detection part 20 when the distal end of the dispenser 30 comes into contact with the object 80. Accordingly, the sensing part 521 determines whether or not the distal end of the dispenser 30 has come into contact with the ejection part 80a based on the detection results output from the force detection part 20 and the detection results stored in the memory unit 53 in advance.

If the sensing part 521 determines contact ("Yes" at step S22), the drive control unit 51 stops driving of the robot 1 (step S23). In this case, the distal end of the dispenser 30 is in the state as shown in FIG. 6. On the other hand, if the sensing part 521 determines non-contact ("No" at step S22), the drive control unit 51 continues to drive the robot 1 until the sensing part 521 determines contact (step S21).

When the sensing part 521 determines contact, the generation part 522 generates data on the position of the distal end of the dispenser 30 in contact with the ejection part 80a (step S24). Further, the memory unit 53 stores the data. The position of the distal end of the dispenser 30 in the data is represented by a robot coordinate system (including the base coordinate system and the local coordinate system).

Then, the drive control unit 51 drives the robot 1 so that the distal end of the dispenser 30 may move from the ejection part 80a by a first distance d (step S25). In the embodiment, the drive control unit 51 drives the robot arm 10 to move the distal end of the dispenser 30 in the +z-axis direction as the direction away from the ejection part 80a. Thereby, as shown in FIG. 7, the distal end of the dispenser 30 is moved to a position P at the first distance d apart from the ejection part 80a in the +z-axis direction.

Here, the first distance d can be set in advance. That is, the memory unit 53 of the control apparatus 5 stores (records) the first distance d in advance. As described above, the control apparatus 5 may set the first distance d according to details of work to be performed by the robot 1, work environments, types of ejected material 90, etc. in advance. For example, in the case where the ejected material 90 as the liquid adhesive is ejected as in the embodiment, the first distance d may be set to about 0.1 mm to 0.3 mm. Thereby, the shape and size (spread) of the ejected material 90 ejected onto the object 80 may be made appropriate. Note that, in the embodiment, the first distance d is the preset distance, however, may be changed or set according to the details of work. For example, the first distance d may be set by the worker searching for an appropriate distance (e.g. a distance at which the size of the ejected material 90 ejected onto the object 80 is appropriate) while ejecting the ejected material 90 to the object 80.

Then, the generation part 522 generates data on the position of the distal end of the dispenser 30 in the position P (step S26). Further, the memory unit 53 stores the data. The position of the distal end of the dispenser 30 in the data is represented by the robot coordinate system. Note that the data may be used as teaching data.

Here, the first processing (step S2) ends.

As described above, after the contact between the dispenser 30 and the object 80 is sensed, the generation part 522 performs first processing (step S2) of generating the data on the position of the dispenser 30 (in the embodiment, the position of the distal end of the dispenser 30) when the dispenser 30 is moved from the object 80 by the first distance d. Here, as described above, the position of the distal end of the dispenser 30 is represented by the robot coordinate system. The robot 1 is controlled using the teaching data generated based on the data obtained by the first processing (step S2), and thereby, the robot 1 may eject the ejected material 90 in an appropriate part (e.g. the ejection part 80a) in proper shape, size, and amount. Further, according to the first processing (step S2), even when the first distance d is relatively as small as about 0.1 mm to 0.3 mm, for example, the data on the position at the desired first distance d apart from the ejection part 80a may be generated.

[3] Second Processing (Step S3)

Then, the control apparatus 5 starts the second processing.

The second processing is processing of generating data on the attitude of the dispenser 30. More specifically, the second processing is processing of generating data on the attitude of the center line A when the attitude of the dispenser 30 with respect to the upper surface of the object 80 is changed based on the output from the first angle detection part 41 (angle detection part) that detects the angle of the center line A of the dispenser 30. As below, the second processing will be explained with reference to the flowchart shown in FIG. 8.

The sensing part 521 senses the second detection result as the detection result output from the second angle detection part 42, and the memory unit 53 records the second detection result sensed by the sensing part 521 (step S31). In the embodiment, the second angle detection part 42 is mounted on the work surface 710, and thus, the value of the second angle detection part 42 is constant. Here, in the embodiment, as described above, the second angle detection part 42 is connected to the control apparatus 5, however, when the second angle detection part 42 is not connected to the control apparatus 5, the worker may manually operates the control apparatus 5 using the input device 46 or the like and allows the control apparatus 5 to store the result. This applies to the first angle detection part 41.

Then, the sensing part 521 senses the first detection result as the detection result output from the first angle detection part 41, and the drive control unit 51 drives the robot 1 so that the first detection result may agree with the second detection result (step S32). Specifically, the drive control unit 51 drives the robot arm 10 to change the attitude of the dispenser 30.

Then, the sensing part 521 determines whether or not the first detection result agrees with the second detection result (step S33).

If the sensing part 521 determines agreement ("Yes" at step S33), the drive control unit 51 stops driving of the robot 1 (step S34). In this case, as shown in FIG. 9, the center line A of the dispenser 30 is perpendicular to the upper surface of the object 80. On the other hand, if the sensing part 521 determines disagreement ("No" at step S33), the drive control unit 51 continues to drive the robot 1 until the sensing part 521 determines agreement (step S32).

When the sensing part 521 determines agreement, the generation part 522 generates data on the attitude of the dispenser 30 when the first detection result agrees with the second detection result (step S35). Further, the memory unit 53 stores the data. The attitude of the dispenser 30 (more specifically, the attitude of the center line A of the nozzle 32) in the data is represented by the robot coordinate system. Here, the generation part 522 may also generate data on the position of the distal end of the dispenser 30 and data on the positions and attitudes of the respective arms 11 to 16.

Then, the memory unit 53 stores the data obtained through step S35 as teaching data. The teaching data includes the data on the above described attitude of the dispenser 30, data on the position of the distal end of the dispenser 30, and data on the positions and attitudes of the respective arms 11 to 16.

Here, the second processing (step S3) ends.

As described above, the generation part 522 of the control apparatus 5 performs the second processing of generating data on the attitude of the dispenser 30 (ejection part) when the attitude of the dispenser 30 (ejection part) with respect to the object 80 is changed based on the output from the first angle detection part 41 (angle detection part) that detects the angle of the dispenser 30 (ejection part) with respect to the object 80. Here, as described above, the position of the distal end of the dispenser 30 (ejection part) is represented by the robot coordinate system. The robot 1 is controlled using the teaching data generated based on the data obtained by the second processing (step S3), and thereby, the robot 1 may eject the ejected material 90 in more proper shape, size, and amount.

As explained above, the control apparatus 5 controls the robot 1 having the dispenser 30 (injection part) that can eject (inject) the ejected material 90 (injected material) to the object 80, and the movable unit 123 including the force detection part 20. Further, the control apparatus 5 includes the generation part 522 that generates teaching data in the position of the movable unit 123 (in the embodiment, the distal end of the dispenser 30) when the movable unit 123 is moved from the object 80 by the first distance d after sensing of the contact between the movable unit 123 and the object 80 (the object on which the robot 1 works) based on the output from the force detection part 20. Thereby, the robot 1 controlled by the control apparatus 5 may appropriately perform the work of ejecting the ejected material 90 to the ejection part 80a (target part) or the like. Particularly, as in the embodiment, work at the first distance d kept without contact between the distal end of the dispenser 30 and the object 80 may be appropriately performed. This is because the work requires ejection of the ejected material 90 in more proper shape, size, and amount. The work with the first distance d kept without contact with the object 80 is not limited to the work of ejecting the ejected material 90 as the liquid adhesive as in the embodiment, but includes work of applying the ejected material 90 such as grease. The control apparatus 5 is effectively used for controlling the robot 1 that performs the work.

The contact with the object 80 may be sensed based on the output from the force detection part 20, and thereby, variations depending on workers in the determination of contact may be reduced. Further, visual confirmation by the worker may be omitted and the reliability of the work performed by the robot 1 based on the teaching data may be improved.

In the embodiment, the second processing (step S3) is performed after the first processing (step S2). Thereby, the accuracy of the teaching data may be improved.

Through the above described [1] direct teaching (step S1), [2] first processing (step S2), and [3] second processing (step S3), the generation of the teaching data in the ejection part 80a ends.

After the generation of the teaching data in the ejection part 80a ends, the control apparatus 5 performs [1] direct teaching (step S1), [2] first processing (step S2), and [3] second processing (step S3) in this order in the same manner as that described above in an ejection part 80b different from the ejection part 80a shown in FIG. 9. Thereby, teaching data in the ejection part 80b is generated. Note that the direct teaching (step S1) may be omitted depending on the size of the object 80 or the like.

In this manner, the control apparatus 5 generates and stores teaching data in several predetermined parts including the ejection part 80a and the ejection part 80b. Then, the control apparatus 5 generates and stores the operation of the robot 1 and the movement route of the distal end of the dispenser 30 based on the obtained plurality of pieces of teaching data. The robot 1 is controlled based on thus obtained operation of the robot 1 and movement route of the distal end of the dispenser 30, and thereby, the work of ejecting the ejected material 90 to the object 80 may be appropriately performed.

As described above, the generation part 522 may generate a continuous movement route of the movable unit 123 (in the embodiment, the distal end of the dispenser 30) along the shape of the object 80 between the ejection part 80a (first part) and the ejection part 80b (second part) based on first data on the position of the movable unit 123 (in the embodiment, the distal end of the dispenser 30) when the movable unit 123 is moved by the first distance d after the contact between the movable unit 123 and the ejection part 80a (first part) of the object 80 is sensed and second data on the position of the movable unit 123 (in the embodiment, the distal end of the dispenser 30) when the movable unit 123 is moved by the first distance d after the contact between the movable unit 123 and the ejection part 80b (second part) different from the ejection part 80a (first part) of the object 80 is sensed. Thereby, the movement route of the distal end of the dispenser 30 between the ejection part 80a and the ejection part 80b may be generated without contact of the distal end of the dispenser 30 with a part between the ejection part 80a and the ejection part 80b of the object 80.

Or, not limited to the continuous movement route, but a stepwise movement route along the shape of the object 80 between the ejection part 80a and the ejection part 80b or a movement route having a discontinuous point can be generated.

Or, the distal end of the dispenser 30 can be moved from the ejection part 80a to the ejection part 80b in continuous contact with the object 80, and data on a position of a line segment apart at the first distance d from a trajectory (line segment) of the movement can be generated. Whether or not the distal end is in continuous contact with the object 80 may be determined based on the output (detection result) from the force detection part 20.

As described above, the above explained robot system 100 includes the control apparatus 5 and the robot 1 controlled by the control apparatus 5 and having the movable unit 123 including the force detection part 20. According to the robot system 100, the robot 1 may appropriately perform work in a target part.

Figure 10:
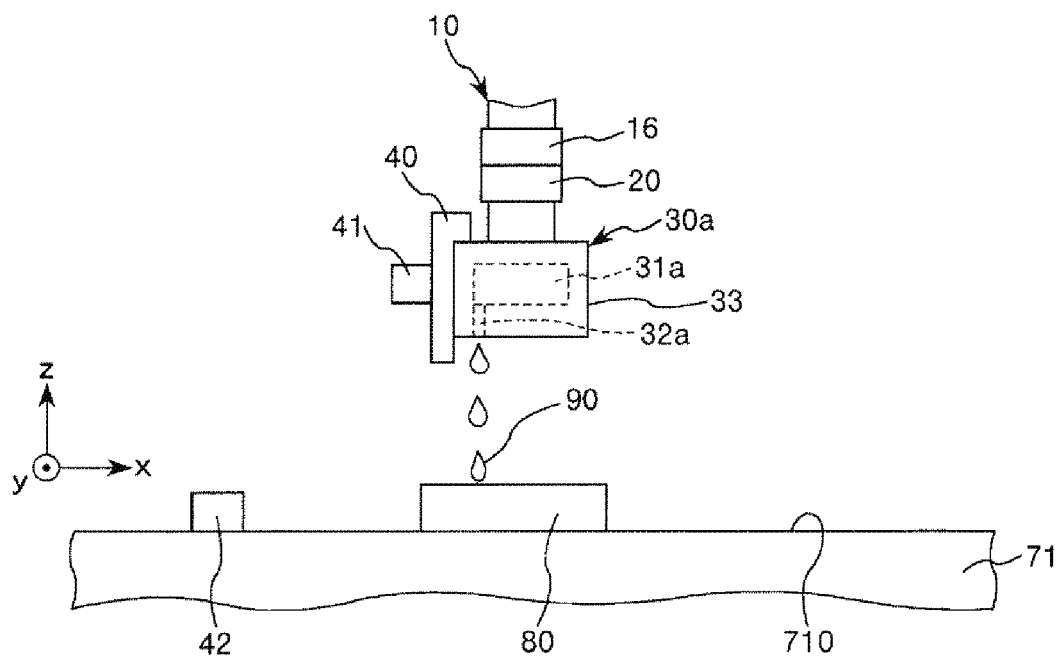
FIG. 10 shows a modified example of the dispenser.

Note that, in the embodiment, as the dispenser that ejects the ejected material 90, the dispenser 30 as shown in FIG. 9 is used, however, for example, a jet dispenser 30a as shown in FIG. 10 may be used.

FIG. 10 shows a modified example of the dispenser.

The jet dispenser 30a has a main body part 31a having a filled portion filled with the ejected material 90 and a nozzle 32a connected to the distal end side of the main body part 31a and ejecting the ejected material 90, and they are provided within a rectangular parallelepiped casing 33. When the jet dispenser 30a is used, a jig 40 having a portion further protruding toward the distal end side (downward) than the casing 33 is attached to the casing 33. Thereby, contact between the jig 40 and the object 80 may be detected by the force detection part 20, and thus, teaching data may be generated in the same manner as that of the above described embodiment.

Further, in the embodiment, in [2] first processing (step S2), the attitude of the dispenser 30 is changed based on the output from the first angle detection part 41 and the second angle detection part 42, however, the attitude of the dispenser 30 may be changed based on the output from the force detection part 20. In this case, for example, the dispenser 30 is brought into contact with the object 80, then, the distal end surface of the dispenser 30 is allowed to follow the upper surface of the object 80 based on the output from the force detection part 20, and thereby, the center line A is made perpendicular to the upper surface of the object 80. Note that a determination as to whether or not the dispenser 30 has come into contact with the object 80 or the like may be made by e.g. whether or not the output from the force detection part 20 has become a predetermined threshold value or more.

Or, though not shown, for example, the dispenser 30 or a fastener that fastens the dispenser 30 to the robot arm 10 is allowed to follow in contact with a jig, wall, or the like at a known angle with respect to the horizontal plane (e.g. perpendicular to the horizontal plane) based on the output from the force detection part 20, and thereby, the attitude of the dispenser 30 may be changed.

Furthermore, in the embodiment, in [2] first processing (step S2), the attitude of the dispenser 30 is changed so that the center line A of the dispenser 30 may be perpendicular to the horizontal plane (the upper surface of the object 80), however, the attitude of the dispenser 30 is not limited to that. In [2] first processing (step S2), the attitude of the dispenser 30 may be changed so that the center line A of the dispenser 30 may be tilted with respect to the horizontal plane. The center line A of the dispenser 30 is tilted with respect to the horizontal plane, and thereby, for example work of ejecting (applying) the ejected material 90 such as an adhesive from a direction tilted with respect to the horizontal plane may be performed. Or, in [2] first processing (step S2), the attitude of the dispenser 30 may be changed so that the center line A may be parallel to the horizontal plane depending on the intended use or the like.

In the embodiment, in [2] first processing (step S2), the first distance d is set (taught) in advance, however, the attitude of the dispenser 30 may also be set (taught) in advance. In this case, [2] first processing (step S2) may be omitted.

Second Embodiment

Next, the second embodiment of the invention will be explained.

Figure 11:
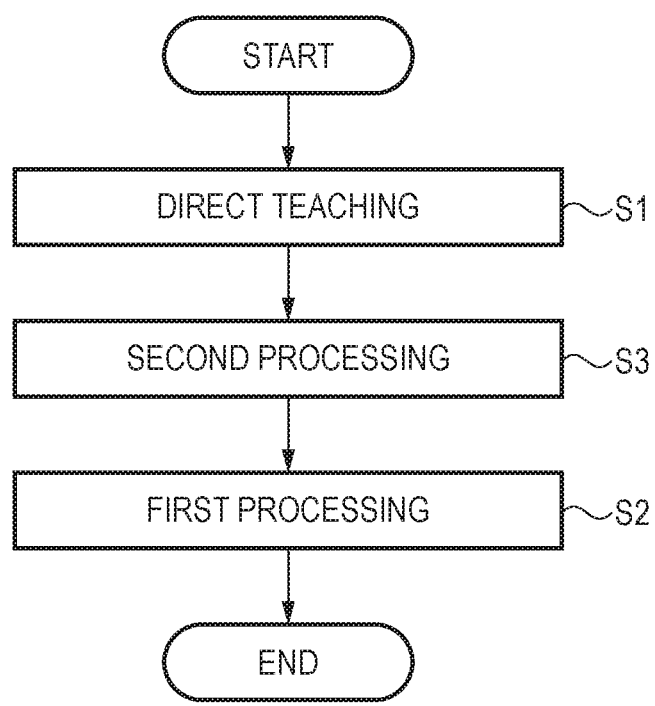
FIG. 11 is a flowchart for explanation of teaching of a robot by a control apparatus of a robot system according to the second embodiment of the invention.

FIG. 11 is a flowchart for explanation of teaching of a robot by a control apparatus of a robot system according to the second embodiment of the invention.

In the following description, the explanation will be made with a focus on the differences from the above described embodiment and the explanation of the same items will be omitted.

As shown in FIG. 11, in the embodiment, [1] direct teaching (step S1), [2] second processing (step S3), and [3] first processing (step S2) are performed in this order.

As described above, the first processing (step S2) is performed after the second processing (step S3). Even in the order, accuracy of teaching data may be made particularly higher. Specifically, the order is effective when the object 80 is tilted with respect to the horizontal plane.

Further, the second processing is performed after the movable unit 123 is moved by direct teaching. According to the direct teaching, the operation of moving the distal end of the dispenser 30 closer to the ejection part 80a (target part) may be promptly and easily taught, and thereby, the second processing may be smoothly performed.

In the second embodiment, as is the case of the first embodiment, teaching data including data on the attitude of the dispenser 30, data on the position of the distal end of the dispenser 30, and data on the positions and attitudes of the respective arms 11 to 16 may be generated.

According to the above explained second embodiment, the robot 1 controlled by the control apparatus 5 may appropriately perform work of ejecting the ejected material 90 to the target part of the object 80 or the like.

In the above described embodiment, the first processing and the second processing are performed in different time zones, however, the first processing and the second processing may be performed at the same time or to temporally overlap. That is, the time zone in which the first processing is performed and the time zone in which the second processing is performed may overlap, or the respective steps of the first processing and the respective steps of the second processing may be respectively arbitrarily combined. As described above, the first processing and the second processing are performed at the same time or to temporally overlap, and thereby, for example, data on the position of the distal end of the dispenser 30 may be generated while the attitude of the dispenser 30 is detected, and thereby, the accuracy of the teaching data may be further improved.

Third Embodiment

Next, the third embodiment of the invention will be explained.

Figure 12:
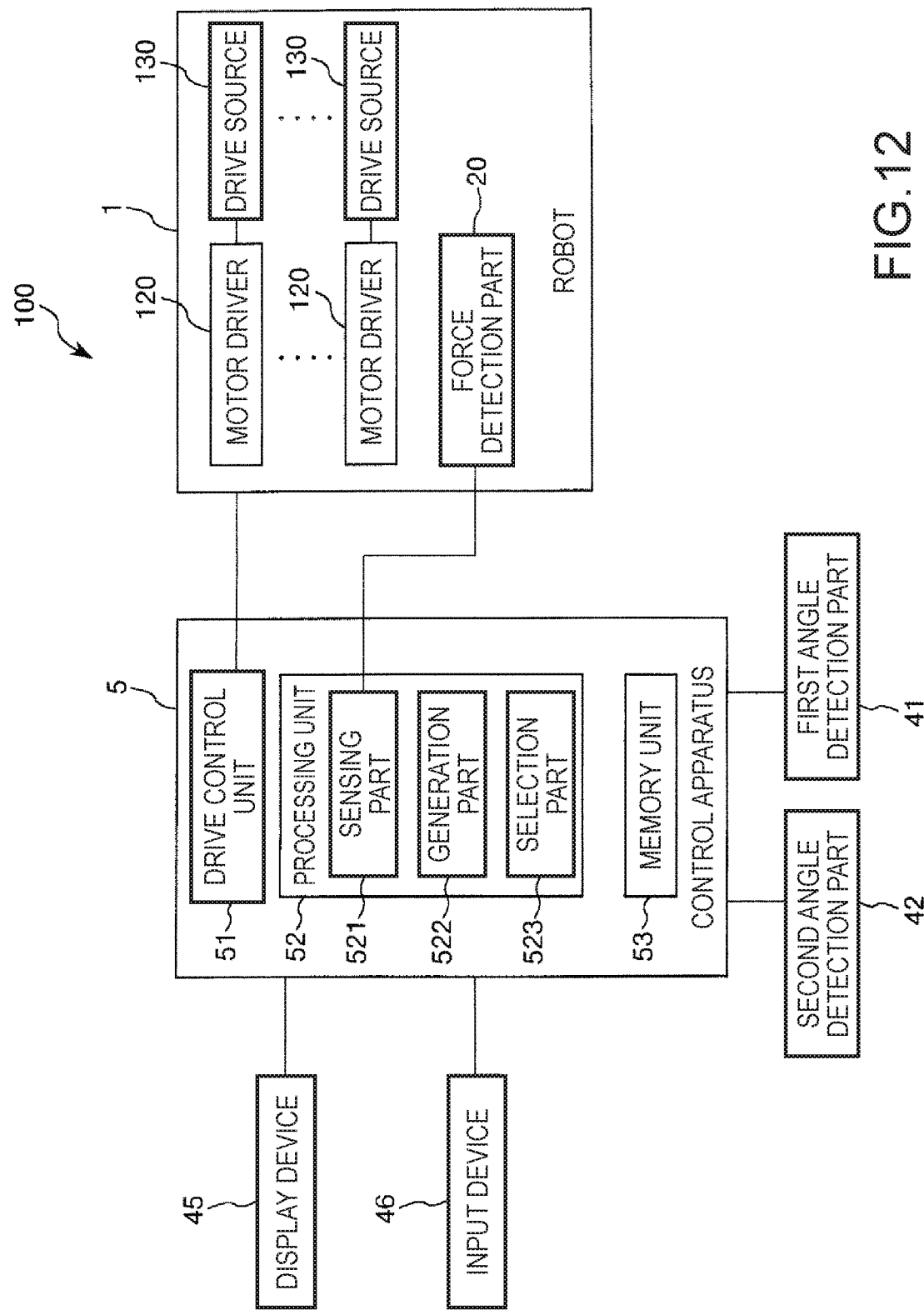
FIG. 12 is a system configuration diagram of a robot system according to the third embodiment of the invention.

FIG. 12 is a system configuration diagram of a robot system according to the third embodiment of the invention.

In the following description, the explanation will be made with a focus on the differences from the above described embodiments and the explanation of the same items will be omitted.

As shown in FIG. 12, in the embodiment, the control apparatus 5 further has a selection part 523. That is, in the embodiment, the control apparatus 5 has the sensing part 521, the generation part 522, and the selection part 523.

The selection part 523 selects one of a first distance d and a second distance d2 set in advance according to an instruction by the worker using the input device 46 or the like, for example. The first distance d and the second distance d2 may be set in the memory unit 53 in advance or may be set by the worker searching for an appropriate distance while ejecting the ejected material 90 to the object 80, for example.

The selection part 523 is provided, and thereby, whether the first distance d or second distance d2 is applied may be selected according to details of work by the robot 1, work environments, types of ejected material 90, etc. in advance. Accordingly, for example, the selection part 523 selects the second distance d2 according to an instruction by the worker using the input device 46 or the like, and thereby, the generation part 522 may generate teaching data in the position of the movable unit 123 when the unit is moved by the second distance d2 different from the first distance d.

Here, the above described selection may be performed before direct teaching (step S1), or performed after the direct teaching (step S1) and before first processing (step S2) (see FIG. 3). Or, the above described selection may be performed before step S25 of the first processing (step S2) (see FIG. 5), for example.

In the control apparatus 5 of the embodiment, the generation part 522 generates teaching data in the position of the movable unit 123 (in the embodiment, the distal end of the dispenser 30) when the movable unit 123 is moved from the object 80 by the second distance d2 different from the first distance d after contact between the movable unit 123 and the object 80 on which the robot 1 works is sensed based on the output from the force detection part 20. Further, the control apparatus 5 includes the selection part 523 that can select the first distance d and the second distance d2. Thereby, an appropriate distance of the movable unit 123 (in the embodiment, the distal end of the dispenser 30) with respect to the object 80 may be set depending on the intended use. Accordingly, the robot may perform optimal operation according to details of work.

Note that, in the embodiment, the selection part 523 can select the two distances of the first distance d and the second distance d2, however, the number of distances that can be selected by the selection part 523 is not limited to two, but may be three or more.

Fourth Embodiment

Next, the fourth embodiment of the invention will be explained.

Figure 13:
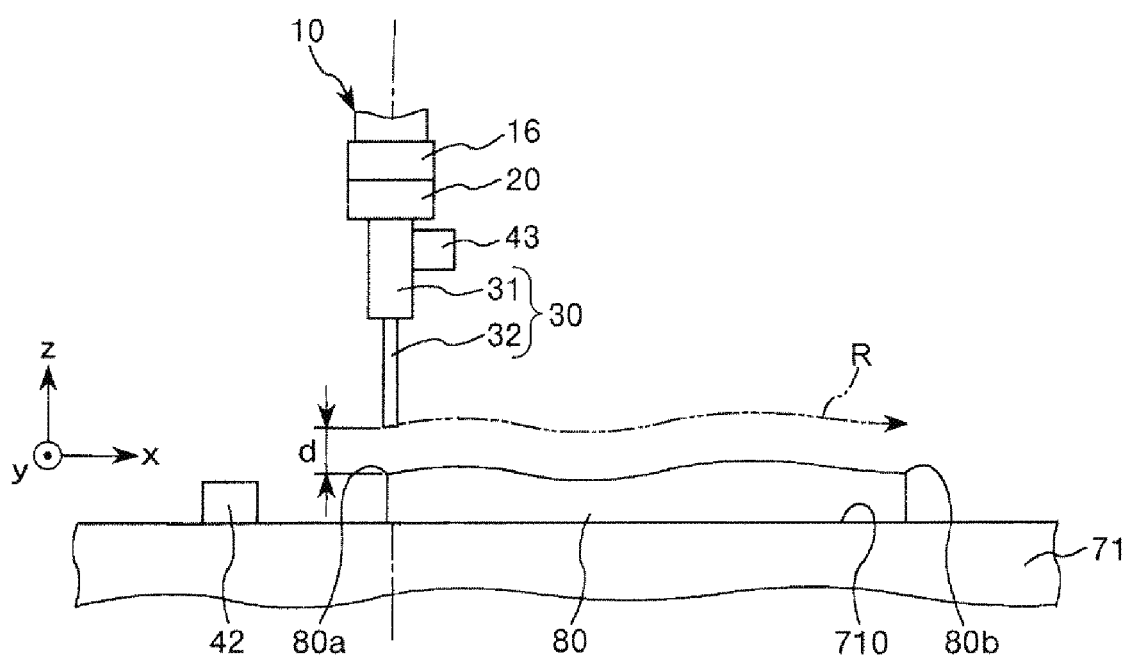
FIG. 13 is a diagram for explanation of teaching of a robot by a control apparatus of a robot system according to the fourth embodiment of the invention.

FIG. 13 is a diagram for explanation of teaching of a robot by a control apparatus of a robot system according to the fourth embodiment of the invention.

In the following description, the explanation will be made with a focus on the differences from the above described embodiments and the explanation of the same items will be omitted.

In the embodiment, for example, a distance detection part 43 including a laser displacement meter is provided. As the laser displacement meter, e.g. a laser displacement meter including a light source (not shown) that can radiate a laser beam and a light receiving device (not shown) on which the laser beam reflected by the object 80 is collected and imaged may be applied. In the distance detection part 43 including the laser displacement meter, the imaging position of the light collected on the light receiving device changes according to the distance to the object 80.

The distance detection part 43 is used, and thereby, a movement route R of the distal end of the dispenser 30 with respect to the object 80 having an uneven upper surface (ejection plane) may be easily generated (see FIG. 13).

Specifically, first, as is the case of the above described embodiment, through [1] direct teaching (step S1), [2] first processing (step S2), and [3] second processing (step S3), teaching data in the ejection part 80a is generated. Then, at the first distance d kept, the distal end of the dispenser 30 is moved in the +x-direction from above the ejection part 80a to above the ejection part 80b (see FIG. 13). In this regard, the distal end of the dispenser 30 is moved in the +x-direction while the distal end of the dispenser 30 is moved in the +z-direction or −z-direction according to the output from the distance detection part 43. As described above, in the distance detection part 43, the imaging position of the light collected on the light receiving device changes according to the distance to the object 80. Accordingly, if the output from the distance detection part 43 changes, the distal end of the dispenser 30 is moved in the +z-direction or −z-direction according to the change, and thereby, the movement route R of the distal end of the dispenser 30 at the first distance d apart from the upper surface of the object 80 may be easily and properly generated. Specifically, when the movement route R with respect to the object 80 having the uneven upper surface as shown in FIG. 13 is generated, the distance detection part 43 is useful.

Not only when the movement route R is generated in the above described manner but also during the operation of the robot 1, the distal end of the dispenser 30 can be moved in the +z-direction or −z-direction according to the output from the distance detection part 43. That is, the first distance d (the position of the distal end of the dispenser 30 with respect to the object 80) can be fed back in real time during the operation of the robot 1. Thereby, for example, even in the case where a plurality of objects have various heights (thicknesses), the robot 1 may perform appropriate work on the plurality of objects based on the movement route R and the output of the distance detection part 43 during operation of the robot 1.

Or, the output of the distance detection part 43 is not used when the movement route R is generated, but the output of the distance detection part 43 during operation of the robot 1 may be used for feedback of the first distance d.

Note that the first angle detection part 41 in the above described embodiment may include the above described laser displacement meter.

Fifth Embodiment

Next, the fifth embodiment of the invention will be explained.

Figure 14:
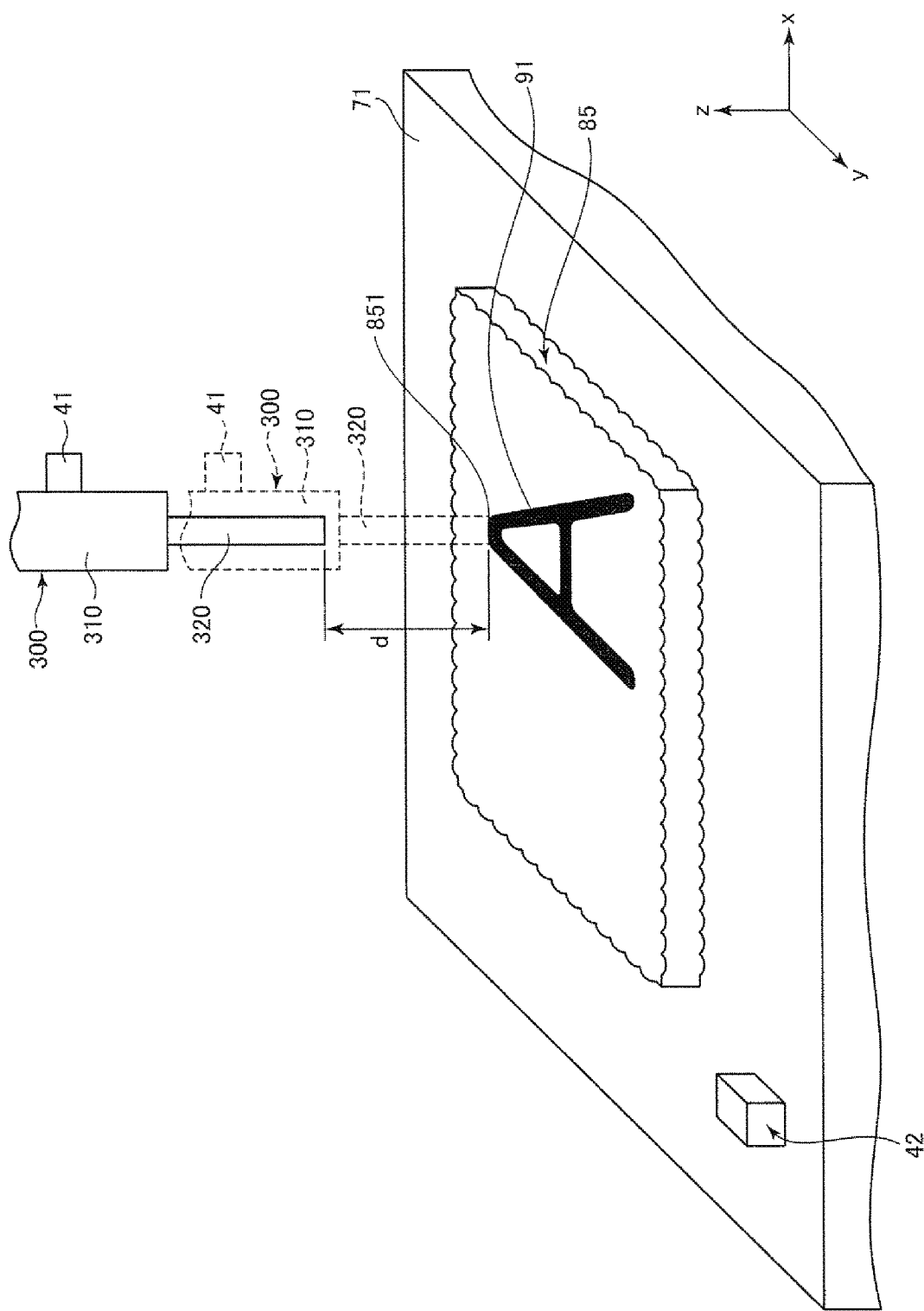
FIG. 14 is a diagram for explanation of teaching of a robot by a control apparatus of a robot system according to the fifth embodiment of the invention.

FIG. 14 is a diagram for explanation of teaching of a robot by a control apparatus of a robot system according to the fifth embodiment of the invention.

In the following description, the explanation will be made with a focus on the differences from the above described embodiments and the explanation of the same items will be omitted.

In the embodiment, work of ejecting food (ejected material) will be explained. As below, work of decorating chocolate 91 as a food (ejected material) on a biscuit 85 (object) will be explained as an example.

The robot 1 in the embodiment includes a food ejector 300 (injection part) that ejects the chocolate 91 (see FIG. 14). The food ejector 300 has a main body part 310 having a filled portion filled with the chocolate 91, and a nozzle 320 (needle) connected to the distal end side of the main body part 310 and ejecting the chocolate 91. The needle-type food ejector 300 is used, and thereby, the chocolate 91 may be ejected with higher accuracy than that in the case where a jet-type food ejector is used. Accordingly, the chocolate 91 may be applied to the biscuit 85 more beautifully.

Also, in teaching of the embodiment, [1] direct teaching (step S1), [2] first processing (step S2), and [3] second processing (step S3) are performed in this order as is the case of the above described embodiments.

Briefly, first, in [1] direct teaching (step S1), the control apparatus 5 moves the distal end of the food ejector 300 closer to an ejection part 851 (part in which ejection is to be performed) of the biscuit 85, and then, resets the force detection part 20.

Then, in [2] first processing (step S2), when sensing contact between the distal end of the food ejector 300 and the biscuit 85 based on the output from the force detection part 20 as shown by broken lines in FIG. 14, the control apparatus 5 moves the distal end of the food ejector 300 from the biscuit 85 in the +z-axis direction by the first distance d as shown by solid lines in FIG. 14. Then, the control apparatus 5 generates data on the position of the moved distal end of the food ejector 300.

Then, in [3] second processing (step S3), the control apparatus 5 changes the attitude of the food ejector 300 as appropriate and generates data on the attitude based on the output from the first angle detection part 41 and the second angle detection part 42 (first detection result and second detection result).

Then, the control apparatus 5 generates teaching data containing the data on the position of the distal end of the food ejector 300 generated in the first processing and the data on the attitude of the food ejector 300 generated in the second processing, and uses the teaching data as data on an ejection start point (a point at which ejection is started). Thereby, the distal end of the food ejector 300 is moved into the x-y plane with reference to the ejection start point, and the chocolate 91 may be ejected to the biscuit 85 at the first distance d kept. For example, the control apparatus 5 generates a movement route of the distal end of the food ejector 300 based on the ejection start point and a route in which "A" is drawn within the x-y plane stored in advance, and thereby, as shown in FIG. 14, a character "A" may be drawn by the chocolate 91 on the surface of the biscuit 85.

In the case where decoration work is performed on a plurality of biscuits 85, the above described generation of teaching data, i.e., generation of data on the ejection start point is performed on the respective biscuits 85. Thereby, even when the heights or the like of the plurality of biscuits have individual differences, accurate and uniform decoration work may be performed on the respective biscuits 85.

Further, the data on the ejection start point is easily generated in the above described manner, and thereby, work of searching for the position of the distal end of the food ejector 300 suitable for the ejection of the chocolate 91 by the worker moving the food ejector 300 little by little directly by hand with respect to the respective biscuits 85 may be omitted.

Note that, in the above described explanation, the food ejected by the food ejector 300 is the chocolate 91, however, not limited to the chocolate 91, but may be e.g. fresh cream or the like. Or, in the above described explanation, the object is not limited to the biscuit 85, but may be e.g. another food such as a cake.

Sixth Embodiment

Next, the sixth embodiment of the invention will be explained.

Figure 15:
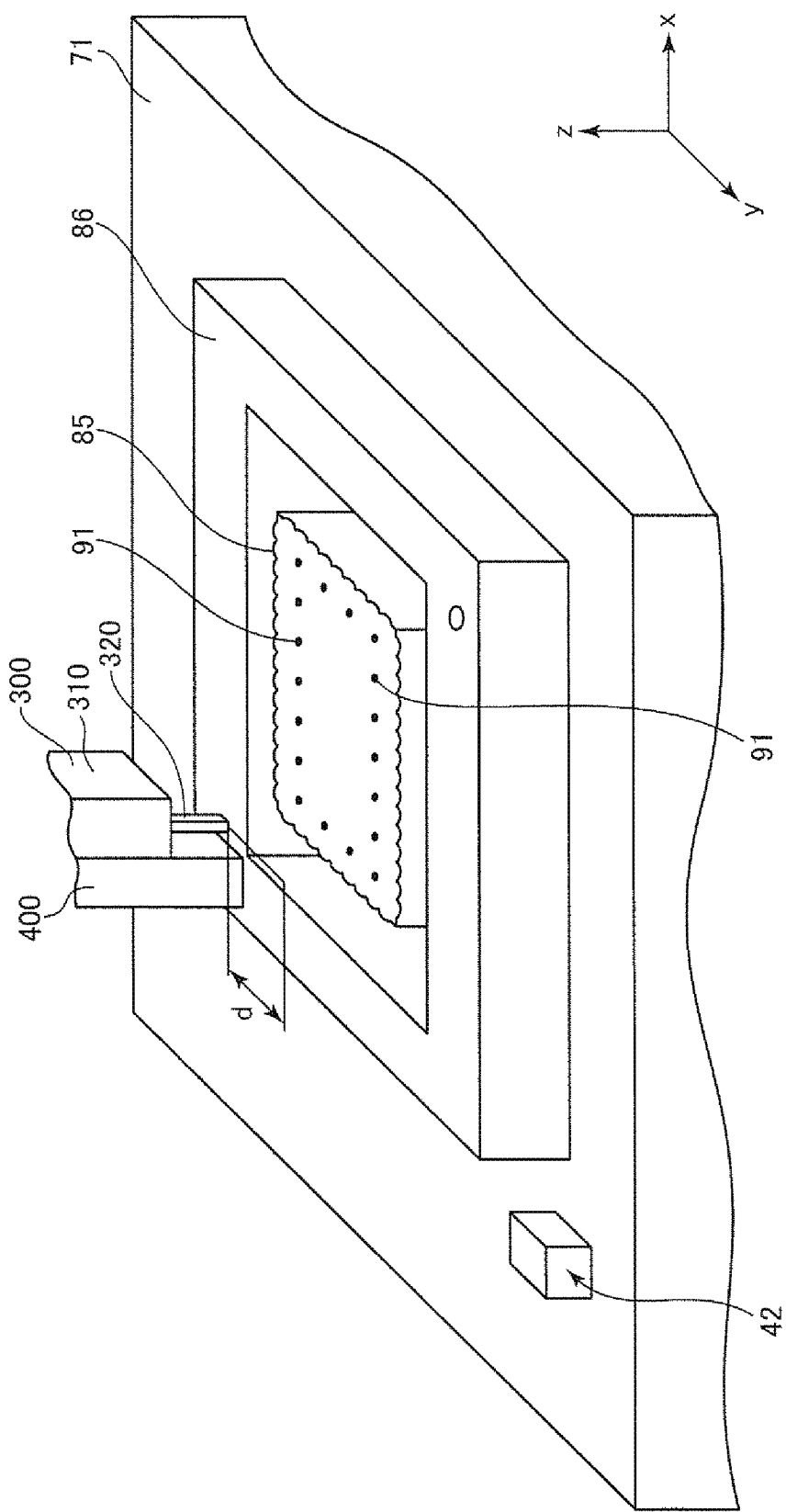
FIG. 15 shows an object used in teaching in the sixth embodiment of the invention.
Figure 16:
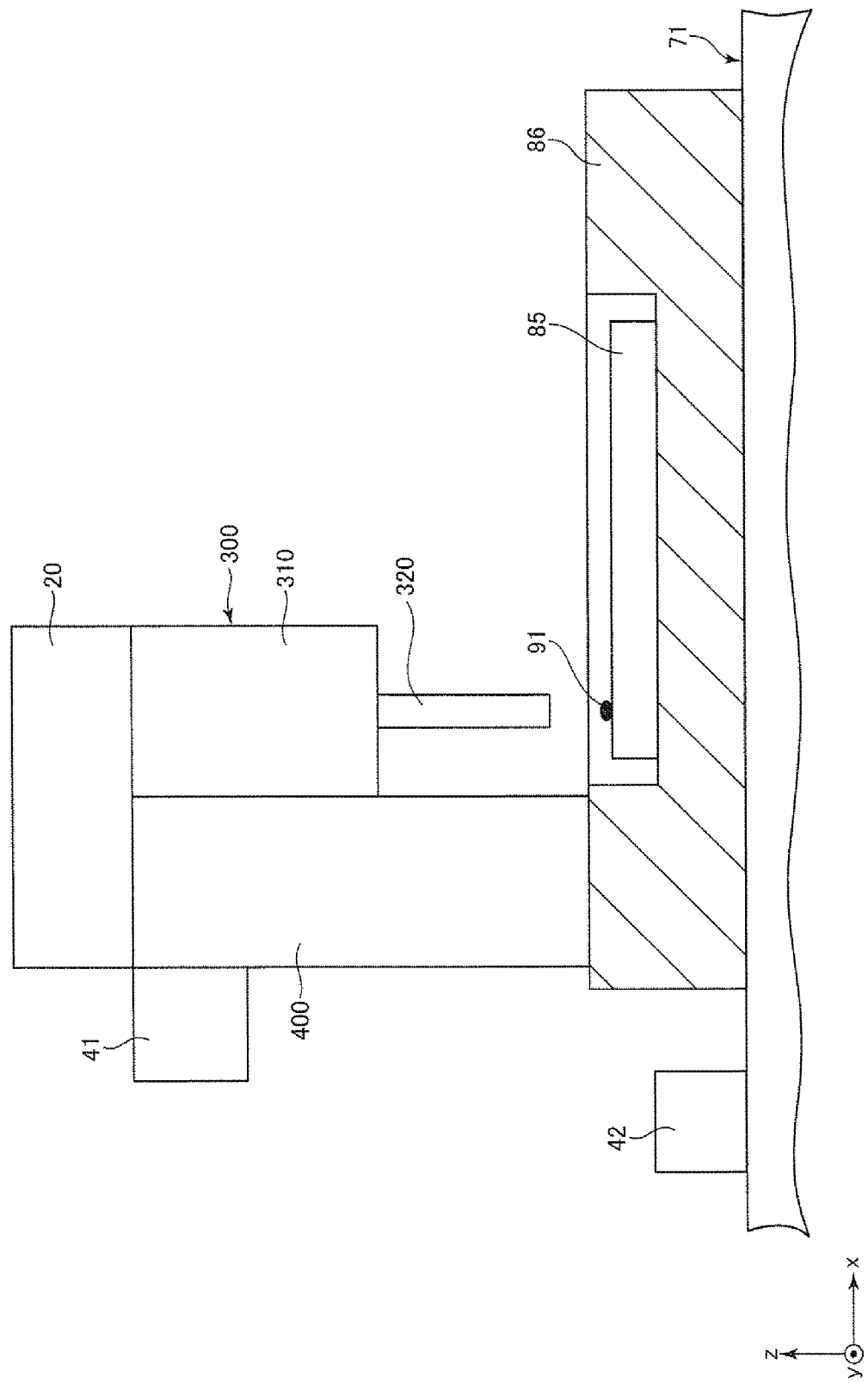
FIG. 16 is a diagram for explanation of teaching with respect to the object shown in FIG. 15.

FIG. 15 shows an object used in teaching in the sixth embodiment of the invention. FIG. 16 is a diagram for explanation of teaching with respect to the object shown in FIG. 15.

In the following description, the explanation will be made with a focus on the differences from the above described embodiments and the explanation of the same items will be omitted.

In the embodiment, work of decorating the chocolate 91 (ejected material) on the biscuit 85 (object) placed within a container 86 will be explained as an example.

As shown in FIG. 15, the biscuit 85 is placed within the container 86 having a depressed portion. In the embodiment, the chocolate 91 is decorated in the outer peripheral portion of the biscuit 85 placed within the container 86.

The robot 1 in the embodiment includes the food ejector 300 (injection part) and a jig 400 (see FIG. 16). The food ejector 300 and the jig 400 are connected to the force detection part 20. The distal end of the jig 400 protrudes from the nozzle 320 (needle) of the food ejector 300 downward (toward the −z-axis side).

Also, in teaching of the embodiment, [1] direct teaching (step S1), [2] first processing (step S2), and [3] second processing (step S3) are performed as is the case of the above described embodiments. Note that, in the embodiment, [2] first processing (step S2) and [3] second processing (step S3) are repeatedly performed.

Briefly, first, in [1] direct teaching (step S1), the distal end of the food ejector 300 is positioned above the biscuit 85 (on the +z-axis side) and the jig 400 is moved closer to the container 86, and then, the force detection part 20 is reset.

Then, [2] first processing (step S2) and [3] second processing (step S3) are repeatedly performed, and a plurality of pieces of teaching data is generated.

Specifically, when sensing contact between the distal end of the jig 400 and the container 86 based on the output from the force detection part 20, the control apparatus 5 moves the distal end of the jig 400 in the +y-axis direction (toward the near side of paper surface in FIG. 16) by the first distance d (see FIGS. 15 and 16). Then, the control apparatus 5 generates data on the position of the moved distal end of the food ejector 300. Then, the control apparatus 5 changes the attitude of the food ejector 300 as appropriate and generates data on the attitude based on the output from the first angle detection part 41 and the second angle detection part 42 (first detection result and second detection result). Then, the control apparatus 5 generates teaching data containing the data on the position of the distal end of the food ejector 300 generated in the first processing and the data on the attitude of the food ejector 300 generated in the second processing.

Furthermore, the control apparatus 5 repeatedly performs the first processing and the second processing, and generates a plurality of pieces of teaching data. Note that the movement by the first distance d in the first processing is performed over the outer periphery of the container 86.

Then, the control apparatus 5 uses the plurality of pieces of teaching data as data on a plurality of ejection points (points at which the chocolate 91 is ejected), and generates a movement route when decoration is performed based on the data on the plurality of ejection points. Thereby, work of ejecting the chocolate 91 on the outer periphery of the upper surface of the biscuit 85 with the clearance between the distal end of the food ejector 300 and the biscuit 85 kept. In this manner, the data on the ejection points may be easily generated, and thereby, teaching work may be easily performed. Accordingly, setting of the ejection points in the decoration work by the worker moving the food ejector 300 little by little directly by hand may be omitted. Further, the contact between the jig 400 and the container 86 may be sensed based on the output from the force detection part 20, and thereby, ejection of the chocolate 91 can be performed in real time while the ejection points are taught. Furthermore, using the movement route generated in the above described manner, decoration of the chocolate 91 may be easily performed on upper surfaces of the plurality of biscuits 85 only by sequential replacement of the plurality of biscuits 85 within the container 86.

Seventh Embodiment

Next, the seventh embodiment of the invention will be explained.

Figure 17:
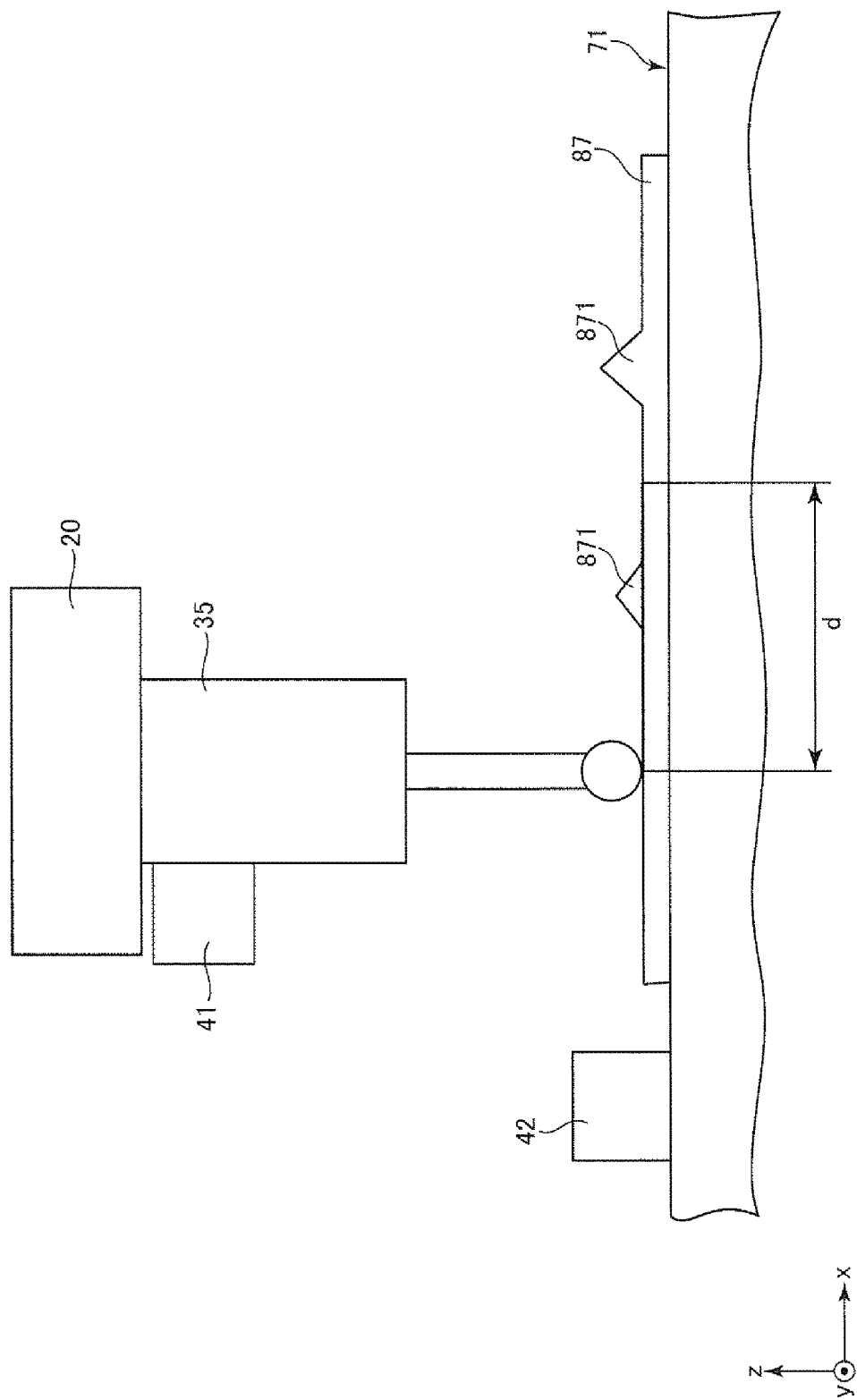
FIG. 17 is a diagram for explanation of teaching of a robot by a control apparatus of a robot system according to the seventh embodiment of the invention.

FIG. 17 is a diagram for explanation of teaching of a robot by a control apparatus of a robot system according to the seventh embodiment of the invention.

In the following description, the explanation will be made with a focus on the differences from the above described embodiments and the explanation of the same items will be omitted.

In the embodiment, deburring work will be explained. As below, as shown in FIG. 17, deburring work of an object 87 having a plurality of burrs 871 will be explained as an example.

The robot 1 in the embodiment includes a deburring router 35 (electric cutting tool) as an injection part (see FIG. 17). The deburring router 35 has a grinding member including a grindstone or the like attached to the tip end thereof, and the member is adapted to rotate at a high speed by a drive mechanism (not shown).

Also, in teaching of the embodiment, [1] direct teaching (step S1), [2] first processing (step S2), and [3] second processing (step S3) are performed as is the case of the above described embodiments. Further, [2] first processing (step S2) and [3] second processing (step S3) are repeatedly performed.

Briefly, first, in [1] direct teaching (step S1), the distal end of the deburring router 35 is moved closer to the object 87, and then, the force detection part 20 is reset.

Then, [2] first processing (step S2) and [3] second processing (step S3) are repeatedly performed, and a plurality of pieces of teaching data is generated.

Specifically, when sensing a state in which the distal end of the deburring router 35 is pressed against the object 87 with a predetermined force in the −z-axis direction based on the output from the force detection part 20, that is, when sensing the predetermined force in the z-axis direction output from the force detection part 20, the control apparatus 5 moves the distal end of the deburring router 35 in the +x-axis direction by the first distance d. Then, the control apparatus 5 generates data on the position of the moved distal end of the deburring router 35. Then, the control apparatus 5 changes the attitude of the deburring router 35 as appropriate and generates data on the attitude based on the output from the first angle detection part 41 and the second angle detection part 42 (first detection result and second detection result). Then, the control apparatus 5 generates teaching data containing the data on the position of the distal end of the deburring router 35 generated in the first processing and the data on the attitude of the deburring router 35 generated in the second processing.

Furthermore, the control apparatus 5 repeatedly performs first processing and second processing, and generates a plurality of pieces of teaching data. Note that the movement by the first distance d in the first processing is performed over the end on the −x-axis side to the end on the +x-axis side of the object 87.

Then, the control apparatus 5 uses the plurality of pieces of teaching data as data on a plurality of work points (points through which the distal end of the deburring router 35 passes), and generates a movement route when deburring is performed based on the data on these work points. In this manner, the data on the work points may be easily generated, and thereby, teaching work may be easily performed. Accordingly, setting of the work points in the deburring work by the worker moving the deburring router 35 little by little directly by hand may be omitted. Further, teaching may be performed while the pressing state on the object 87 in the −z-axis direction at constant pressure based on the output form the force detection part 20 is kept, and thereby, the deburring work may be performed on the object 87 with higher accuracy.

Note that, in the embodiment, the deburring router 35 is attached to the robot 1 (in the embodiment, the force detection part 20) and the object 87 is mounted on the worktable 71, however, the object 87 may be attached to the robot 1 and an electric cutting tool corresponding to the deburring router 35 may be mounted on the worktable 71.

As above, the control apparatus, robot, and robot system according to the invention are explained with reference to the illustrated embodiments, however, the invention is not limited to those. The configurations of the respective parts may be replaced by arbitrary configurations having the same functions. Further, other arbitrary configurations may be added to the invention. Furthermore, the respective embodiments may be appropriately combined.

In the above described embodiments, the case where the robot is installed on the worktable is explained as the example, however, the installation location of the robot is arbitrary, not limited to that. The robot may be provided on e.g. a wall, ceiling, movable platform, or the like.

In the above described embodiments, the six-axis vertical articulated robot is explained, however, the robot according to the invention is not limited to that as long as the robot is controlled by the control apparatus according to the invention and has the movable unit and the force detection part and may be applied to e.g. a horizontal articulated robot.

In the above described embodiments, as the force detection part of the robot, the six-axis force sensor is explained as the example, however, the force detection part is not limited to that, but the so-called three-axis force sensor may be used depending on the configuration of the robot, details of work, or the like. For example, in the case where the robot is a horizontal articulated robot or the like, the three-axis force sensor may be used.

In the above described embodiments, the case where the force detection part is provided in the distal end portion of the robot arm of the movable unit is explained as the example, however, the placement part of the force detection part may be any part as long as the forces and moment applied to the movable unit may be detected. For example, the force detection part may be provided in the proximal end portion of the sixth arm (between the fifth arm and the sixth arm).

In the above described embodiments, the configuration in which the movable unit has the force detection part and the injection part is explained as the example, however, the movable unit may have another part than the robot arm, force detection part, and injection part depending on the configuration of the robot or the like.

The form of the injected material may be liquid, gel, solid, gas such as the air. Or, the injected material may be light such as laser. Further, the injection part may be e.g. an applicator that applies grease, a laser machining tool for machining such as deburring, or the like as long as the injection part can inject the injected material to the object. For example, in the case where a laser machining tool is used, in the first processing, after contact between the object and the machining tool is sensed, data on the position of the machining tool when the machining tool is separated at the first distance from the object (specifically, the position of the part of the machining tool from which laser is output) may be generated, and teaching data may be generated using the data on the position.

In the above described embodiments, the control apparatus performs processing of moving the movable unit in the direction away from the object by the first distance, however, the movement direction is not limited to that as long as the robot is controlled to move the movable unit by the first distance. According to the control apparatus according to the invention, for example, the movable unit can be moved in a pushing direction into the object depending on details of work of the robot or the like. Further, the movable unit can be moved in the x-directions and y-directions.

In the above described embodiments, the case where the first distance is constant is explained, however, the first distance may be different between the first part and the second part, for example.

The entire disclosures of Japanese Patent Application Nos. 2016-167623, filed Aug. 30, 2016 and 2017-107555, filed May 31, 2017 are expressly incorporated by reference herein.

What is claimed is:

1. A control apparatus that controls a robot having a force detection member and a movable member including an injection member that is configured to inject an injection material to an object, the control apparatus comprising:
a processor that is configured to generate first teaching data in a position of the movable member when the movable member is moved from the object by a first distance after sensing of contact between the movable member and the object based on output from the force detection member,
wherein the processor is configured to perform first processing of generating data on a position of the injection member when the injection member is moved from the object by the first distance after sensing of the contact between the injection member and the object, and
the processor is configured to perform second processing of generating data on an attitude of the injection member when the attitude of the injection member with respect to the object is changed based on output from an angle detection member that is configured to detect an angle of the injection member with respect to the object.

2. The control apparatus according to claim 1, wherein the angle detection member controls the robot provided with the movable member.

3. The control apparatus according to claim 1, wherein the second processing is performed based on output from an inclinometer as the angle detection member.

4. The control apparatus according to claim 1, wherein the first processing or the second processing is performed after the movable member is moved by direct teaching.

5. The control apparatus according to claim 1, wherein the second processing is performed after the first processing.

6. The control apparatus according to claim 1, wherein the first processing is performed after the second processing.

7. The control apparatus according to claim 1, wherein the first processing and the second processing are performed at the same time or to temporally overlap.

8. The control apparatus according to claim 1, wherein the first distance is set in advance.

9. The control apparatus according to claim 1, wherein the processor is configured to generate a continuous movement route of the movable member along a shape of the object between a first part of the object and a second part of the object based on first data on a position of the movable member when the movable member is moved by the first distance after contact between the movable member and the first part of the object is sensed and second data on a position of the movable member when the movable member is moved by the first distance after contact between the movable member and the second part different from the first part is sensed.

10. The control apparatus according to claim 1, further comprising a selection member that is configured to select the first distance and a second distance,
wherein the processor is configured to generate second teaching data in a position of the movable member when the movable member is moved from the object by the second distance different from the first distance after contact between the movable member and the object on which the robot works based on the output from the force detection member.

11. A robot comprising:
a movable member including an injection member that is configured to inject an injection material to an object; and
a force detection member configured to detect a force so as to generate an output,
wherein the robot is controlled by a control apparatus, the control apparatus includes a processor, the processor is configured to generate teaching data in a position of the movable member when the movable member is moved from the object by a first distance after sensing of contact between the movable member and the object based on output from the force detection member,
wherein the processor is configured to perform first processing of generating data on a position of the injection member when the injection member is moved from the object by the first distance after sensing of the contact between the injection member and the object, and
the processor is configured to perform second processing of generating data on an attitude of the injection member when the attitude of the injection member with respect to the object is changed based on output from an angle detection member that is configured to detect an angle of the injection member with respect to the object.

12. The robot according to claim 11,
wherein the angle detection member controls the robot provided with the movable member.

13. The robot according to claim 11,
wherein the second processing is performed based on output from an inclinometer as the angle detection member.

14. The robot according to claim 11,
wherein the first processing or the second processing is performed after the movable member is moved by direct teaching.

15. A robot system comprising:
a movable member including an injection member that is configured to inject an injection material to an object;
a force detection member configured to detect a force so as to generate an output; and
a control apparatus including a processor, the processor being configured to generate teaching data in a position of the movable member when the movable member is moved from the object by a first distance after sensing of contact between the movable member and the object based on output from the force detection member,
wherein the processor is configured to perform first processing of generating data on a position of the injection member when the injection member is moved from the object by the first distance after sensing of the contact between the injection member and the object, and
the processor is configured to perform second processing of generating data on an attitude of the injection member when the attitude of the injection member with respect to the object is changed based on output from an angle detection member that is configured to detect an angle of the injection member with respect to the object.

16. The robot system according to claim 15,
wherein the angle detection member controls the robot provided with the movable member.

17. The robot system according to claim 15,
wherein the second processing is performed based on output from an inclinometer as the angle detection member.

18. The robot system according to claim 15,
wherein the first processing or the second processing is performed after the movable member is moved by direct teaching.

19. The robot according to claim 11,
wherein the first processing and the second processing are performed at the same time or to temporally overlap.

20. The robot system according to claim 15,
wherein the first processing and the second processing are performed at the same time or to temporally overlap.

* * * * *